US009511561B2

(12) United States Patent
Johnson et al.

(10) Patent No.: US 9,511,561 B2
(45) Date of Patent: Dec. 6, 2016

(54) MULTI-LAYER FORMS AND METHODS OF MANUFACTURING THE SAME

(71) Applicant: R. R. Donnelley & Sons Company, Chicago, IL (US)

(72) Inventors: Joshua Johnson, Green Bay, WI (US); Lynn Baeten, Green Bay, WI (US); Eric M. Wood, Schaumburg, IL (US); Kevin Pulley, De Pere, WI (US)

(73) Assignee: R.R. DONNELLEY & SONS COMPANY, Chicago, IL (US)

( * ) Notice: Subject to any disclaimer, the term of this patent is extended or adjusted under 35 U.S.C. 154(b) by 198 days.

(21) Appl. No.: 14/025,570

(22) Filed: Sep. 12, 2013

(65) Prior Publication Data

US 2015/0072098 A1  Mar. 12, 2015

(51) Int. Cl.
*B32B 3/30* (2006.01)
*B32B 27/10* (2006.01)
*B32B 3/26* (2006.01)
(Continued)

(52) U.S. Cl.
CPC ............... *B32B 3/30* (2013.01); *B32B 3/266* (2013.01); *B32B 7/06* (2013.01); *B32B 27/10* (2013.01); *B32B 37/02* (2013.01); *B32B 37/1284* (2013.01); *B32B 38/0004* (2013.01); *B32B 38/06* (2013.01); *B42D 25/425* (2014.10); *B42D 25/47* (2014.10); *B32B 2250/04* (2013.01); *B32B 2317/12* (2013.01); *B32B 2325/00* (2013.01); *B32B 2425/00* (2013.01);
(Continued)

(58) Field of Classification Search
CPC .................................................. B32B 2425/00
USPC ......... 283/106–111, 904; 156/227, 226, 216; 40/620–632
See application file for complete search history.

(56) References Cited

U.S. PATENT DOCUMENTS 5,283,093 A * 2/1994 All ........................... G09F 1/04
283/109
6,024,278 A 2/2000 Martin
(Continued)

FOREIGN PATENT DOCUMENTS

WO          0126892       4/2001
WO        2011141870     11/2011

OTHER PUBLICATIONS

European Patent Office, "Extended European Search Report," issued in connection with European Patent Application No. 14184435.7, issued on Feb. 10, 2015, 7 pages.
(Continued)

*Primary Examiner* — Michael N Orlando
*Assistant Examiner* — Marta Dulko
(74) *Attorney, Agent, or Firm* — Hanley, Flight & Zimmerman, LLC

(57) ABSTRACT

Multi-layer forms and methods of producing the same are disclosed herein. An example apparatus includes a first substrate first layer having a first side and a second side. The apparatus includes a second substrate first layer having a third side and a fourth side. The second side is coupled to the third side. The first substrate first layer and the second substrate first layer are embossed. The apparatus includes a second substrate second layer having a fifth side and a sixth side, the fourth side coupled to the fifth side. The apparatus includes a second substrate first layer having a seventh side and an eighth side. The seventh side is coupled to the sixth side. The second substrate first layer and the second substrate second layer are not embossed.

17 Claims, 30 Drawing Sheets

(51) Int. Cl.
- *B32B 37/02* (2006.01)
- *B32B 38/00* (2006.01)
- *B32B 38/06* (2006.01)
- *B32B 7/06* (2006.01)
- *B32B 37/12* (2006.01)
- *B42D 25/425* (2014.01)
- *B42D 25/47* (2014.01)

(52) U.S. Cl.
CPC .... *Y10T 156/1041* (2015.01); *Y10T 156/1044* (2015.01); *Y10T 428/15* (2015.01); *Y10T 428/24612* (2015.01)

(56) References Cited

U.S. PATENT DOCUMENTS 6,682,798 B1    1/2004  Kiraly
2011/0084122 A1  4/2011  Rodgers

OTHER PUBLICATIONS

European Patent Office, "Communication pursuant to Article 94(3) EPC," issued in connection with European Patent Application No. 14184435.7, issued on Sep. 18, 2015, 6 pages.

Canadian Intellectual Property Office, "Examiner's Report," issued in connection with Canadian Patent Application No. 2,861,365, issued on Jul. 8, 2016, 3 pages.

European Patent Office, "Communication under Rule 71(3) EPC," issued in connection with European Patent Application No. 14184435.7, issued on May 25, 2016, 3 pages.

Canadian Intellectual Property Office, "Examiner's Report", issued in connection with Canadian Application No. 2,861,365, issued on Nov. 30, 2015, 3 pages.

* cited by examiner

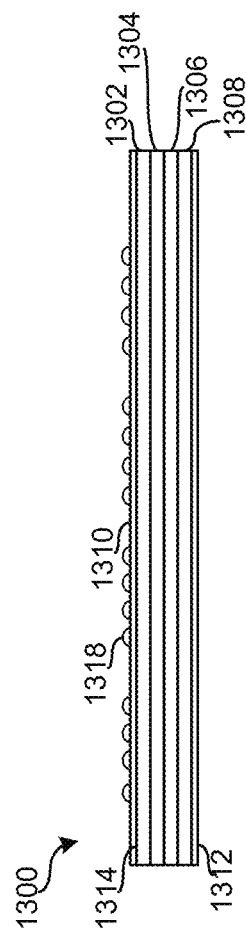
FIG. 13
FIG. 14

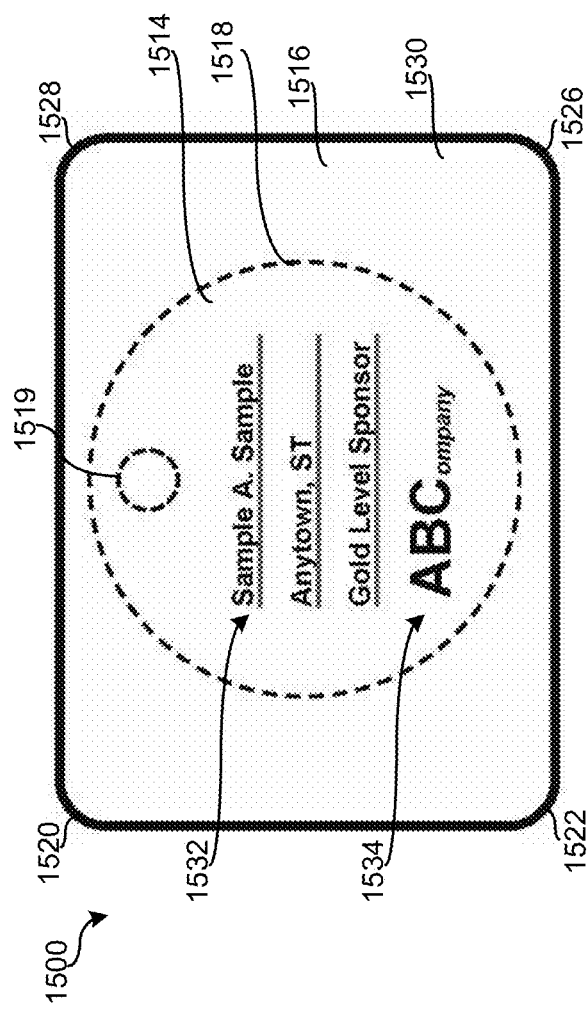
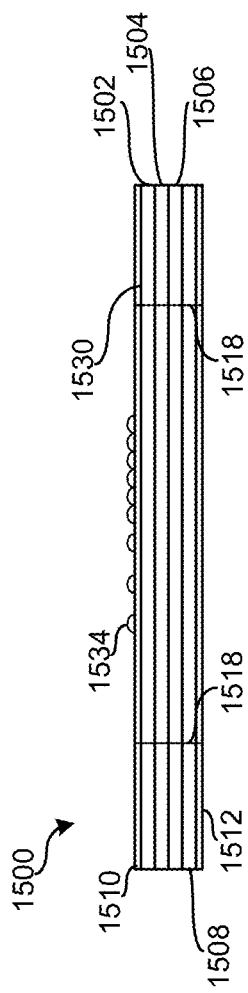
FIG. 15
FIG. 16

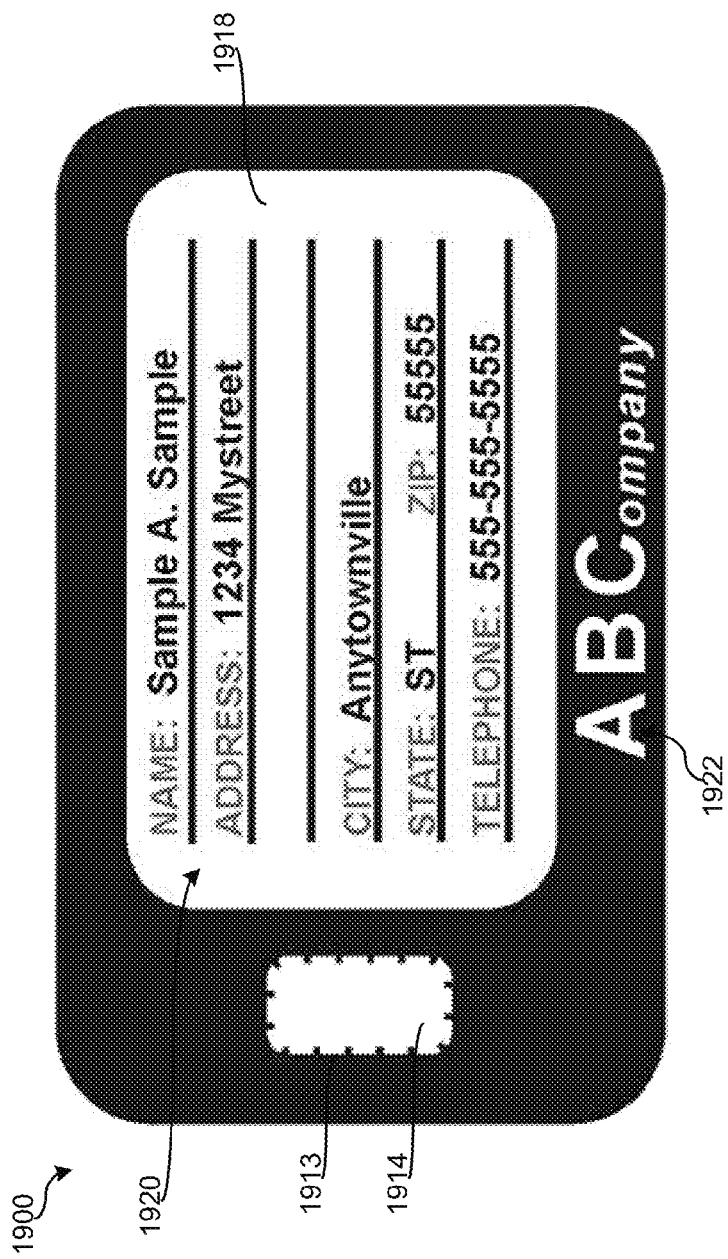
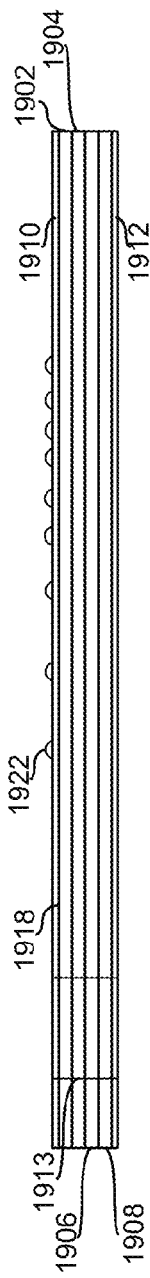
FIG. 19
FIG. 20

MULTI-LAYER FORMS AND METHODS OF MANUFACTURING THE SAME

FIELD OF THE DISCLOSURE

This patent relates to multi-layer forms and, more specifically, to multi-layer forms and methods of producing the same.

BACKGROUND

Cards or tags may be produced for identification purposes.

BRIEF DESCRIPTION OF THE DRAWINGS

FIGS. 13 and 14 depict an example card and/or form in accordance with the teachings of this disclosure.

FIGS. 15 and 16 depict an example sponsorship tag and/or form in accordance with the teachings of this disclosure.

FIGS. 19 and 20 depict an example luggage tag and/or form in accordance with the teachings of this disclosure.

DETAILED DESCRIPTION

Figure 1:
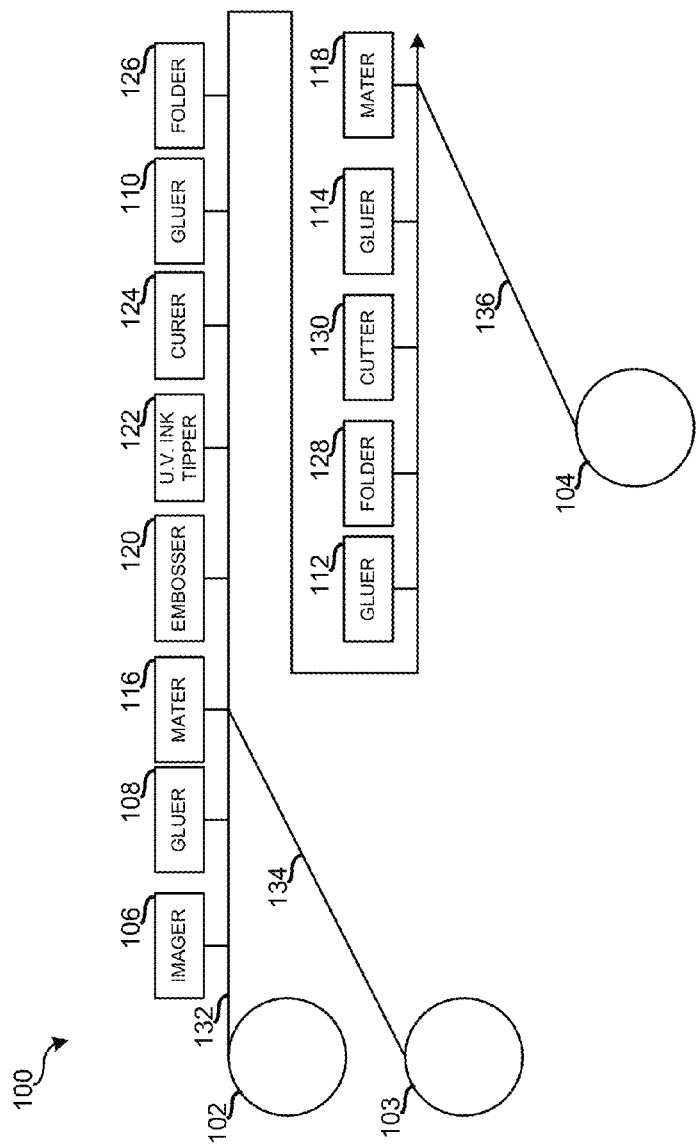
FIG. 1 depicts an example apparatus that can be used to produce the example multi-layer forms disclosed herein.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to example forms (e.g., mailers, sponsorship tags, ornaments, luggage tags, card and key tags and/or removable inserts) produced in an in-line process. In some examples, the forms are produced using a multi-ply paper card surrounded by and/or positioned between polystyrene (poly). One or more of the plies may be static and/or variably embossed and/or imaged (e.g., static and/or variably imaged) to enable a single print run to produce custom and/or different forms for different customers, recipients, etc. In some examples, the forms may be embossed and/or imaged with a number, a recipient's name, a company's name, advertising material and/or any other indicia. The embossed area may be ink tipped to visually differentiate the embossed area from the rest of the form.

In some examples, the forms are produced by mating paper web(s) and polystyrene (poly) web(s) and cutting, creasing, scoring, folding and/or gluing one or more of the webs before and/or after the webs are mated. In some examples, the paper web is wider than the poly web. The paper web may be variably imaged on a first side and adhesive and/or paste may be applied to approximately one half of the first side (e.g., over the imaging) to enable the poly web to be adhered to the first side of the paper web and for the poly web to cover half of the first side of the paper web (e.g., over the imaging).

In some examples, the mated webs travel through an embosser (e.g., opposing rollers) where a portion of the mated webs is embossed with, for example, a number (e.g., static fictitious credit card numbers, a variable number), a company's name or any other indicia. In some examples, the embossed portion corresponds to the front of the form and/or to one half of the poly web. The embossed area may be ink tipped (e.g., U.V. ink tipped) and cured.

In some examples, adhesive and/or paste is applied to approximately one half of a second side of the paper web and the webs are folded in half to couple the second side side of the paper substrate together. In some examples, adhesive and/or paste is then applied to approximately one half of the first side of the paper web (e.g., the half of the first side without the poly) and the webs are folded in half such that the first side of the paper web is coupled together and the poly web forms the front and back surfaces of the form. In some examples, the folded webs are die cut to round the corners of the form and/or perforations are added to enable the form to be easily removed from a waste matrix. The completed forms may then be glued to a carrier and/or another web and/or packaged for shipment. The example form may be a card, a sponsorship and/or luggage tag, a card and key tag, an ornament, etc.

While the above-example describes the first substrate as being a paper web and the second substrate as being a poly web, the substrates may be any other suitable material such as, for example, a plastic and/or Polyethylene terephthalate (PET) web and a poly web. In such examples, the plastic web may include a plurality of tags (e.g., RFID tags) coupled thereto. Thus, the cards and/or forms produced may include an internal tag and/or intelligent functionality.

FIG. 1 represents an example apparatus 100 that can be used to implement the processes disclosed herein to produce the example cards, tags, forms, etc. In some examples, the apparatus 100 may be an in-line process and includes first, second and third substrate movers 102, 103, 104; an imager (e.g., a variable imager) 106; gluers 108, 110, 112, 114; maters 116, 118; an embosser (e.g., a static embosser) 120; a U.V. ink tipper 122; a curer 124; folders 126, 128; and a cutter 130. While the stations and/or portions 102-130 of the apparatus 100 are depicted in a particular order, the stations and/or portions 102-130 may be arranged differently. While the apparatus 100 is depicted as having the gluers 110, 112 being separate from the folders 126, 128, in other examples, the gluer(s) and the folding station(s) may be combined.

In some examples, during operation, the first substrate mover 102 feeds one or more pieces of first substrate and/or a web of first substrate 132 into the apparatus 100. In some examples, the imager 106 images a first side of the first substrate 132. The images may include personal information (e.g., a name, an address, etc.), brand-related images and/or text, advertisement related images and/or text, instructional images and/or text, etc. However, in other examples, the apparatus 100 does not include the imager 106 and, thus the first substrate 132 is imaged at a different location (e.g., the first substrate 132 is pre-imaged) and/or the first substrate 132 is not imaged.

The first gluer 108 may apply glue to a first portion of the first surface and the mater 116 may mate the first surface portion with a second substrate 134 such that the first and second substrates 132, 134 are coupled. In some examples, the second substrate 134 is fed to the mater 116 by the second substrate mover 103. In some examples, the first substrate 132 is paper, Polyethylene terephthalate (PET) and/or plastic and the second substrate 134 is poly and/or any other type of film. The embosser 120 receives and embosses the mated webs of the substrates 132, 134. In some examples, the embosser 120 is a static embosser that embosses a name, a number, etc. on the mated webs of the substrates 132, 134. However, in other examples, the embosser 120 is a variable embosser. The U.V. ink tipper 122 may apply ink to the embossed area and the curer 124 may cure the ink. In some examples, ink tipping the embossed area enables the embossed area to be visually differentiated from the surrounding substrate.

The second gluer 110 may apply glue to a second surface of the first substrate 132 and the first folder 126 may fold the first substrate 132 in half along a first fold such the second surface of the first substrate 132 is coupled together and the second substrate 134 is on a first side of the fold (e.g., the first folder 126 folds the first substrate 132 in half along along the first fold where the first fold is adjacent an edge of the second substrate 134). The second gluer 112 may then apply glue to a second portion of the first surface of the first substrate 132 and the second folder 128 may fold the substrates 132, 134 in half along a second fold line such that the first surface of the first substrate 132 is coupled together and the second substrate 134 forms outward facing surfaces of the card, tag and/or form being produced. In some examples, the second fold line may be substantially parallel to the first fold line. As used herein, the phrase substantially parallel means between about ten degrees of parallel and/or accounts for manufacturing tolerances. In some examples, the second substrate 134 forms an exterior surface (e.g., a back surface, a front surface) and/or layers of the produced card, tag and/or form and the first substrate 132 forms interior surfaces and/or layers of the produced card, tag and/or form.

The cutter 130 may round the corners of the card, tag and/or form being produced, add one or more lines of weakness to the card, tag and/or form and/or cut and/or remove a waste matrix surrounding the card, tag and/or form being produced. In some examples, the gluer 114 may apply glue to a back surface of the completed card, tag and/or form (e.g., the smooth back surface opposite the embossed front surface) and the mater 118 may mate the completed card, tag and/or form with a third substrate 136. The third substrate 136 may be a carrier web used to produce a mailer, a mailer insert, a form, etc.

Figure 2:
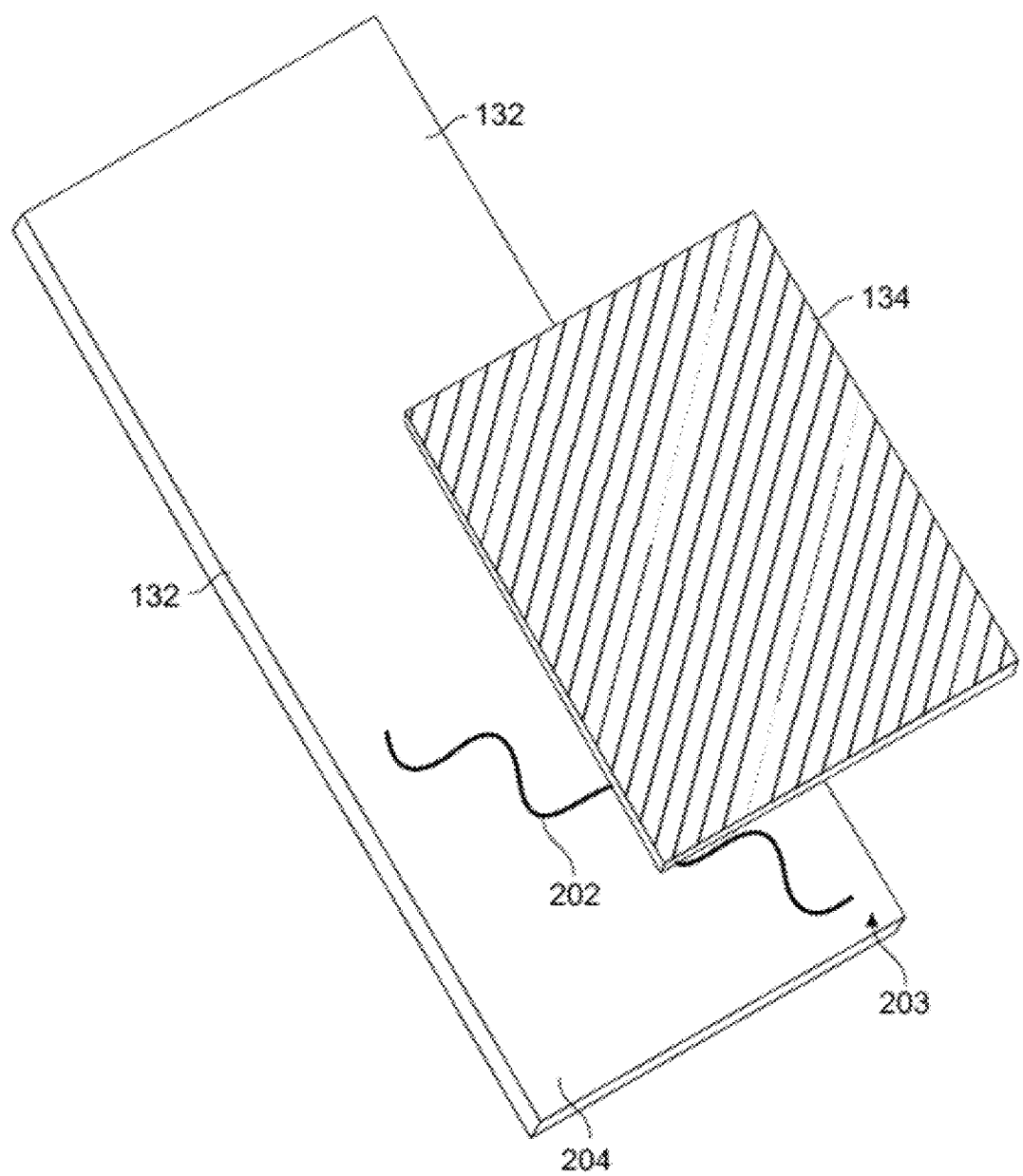
FIGS. 2-12 depict an example multi-layer form at various stages of an example production process.
Figure 3:
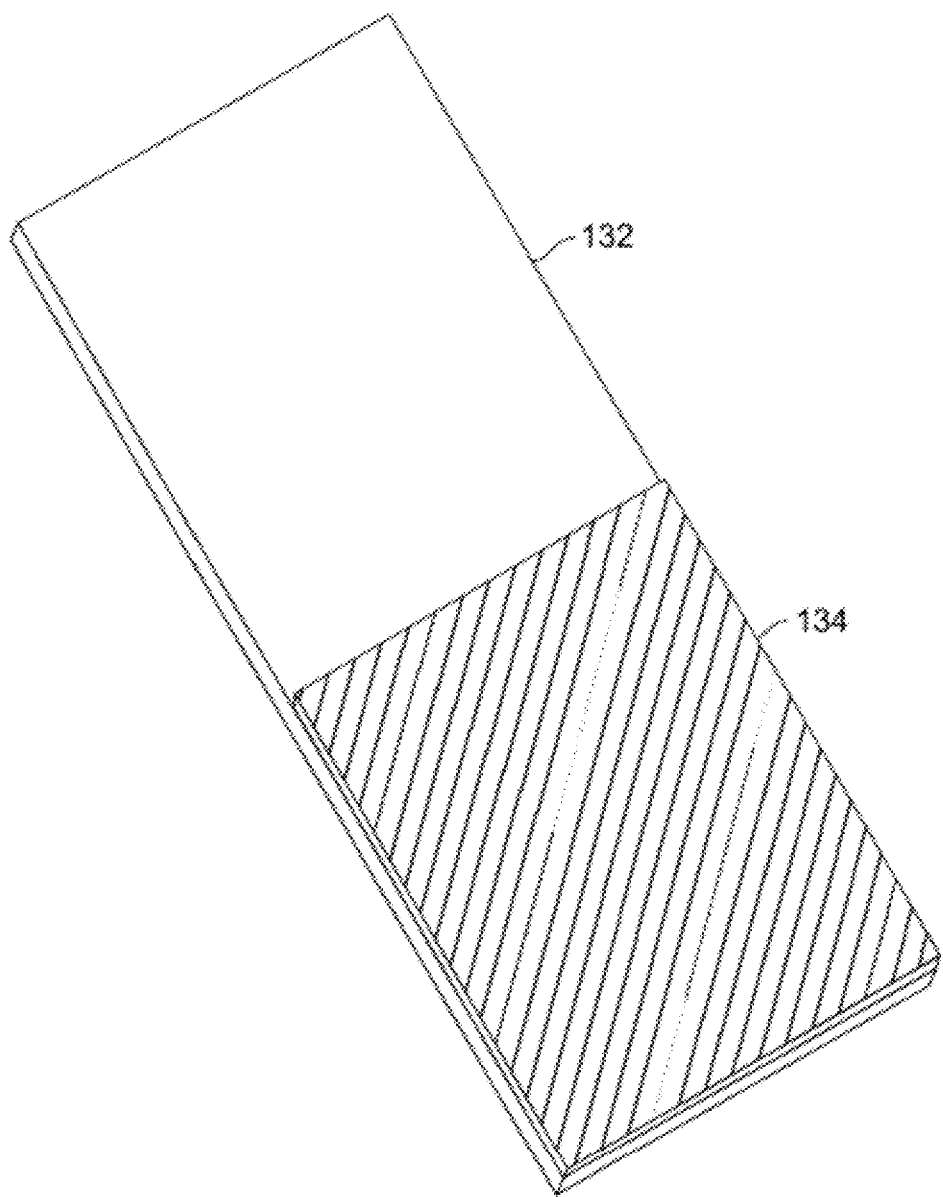
Figure 4:
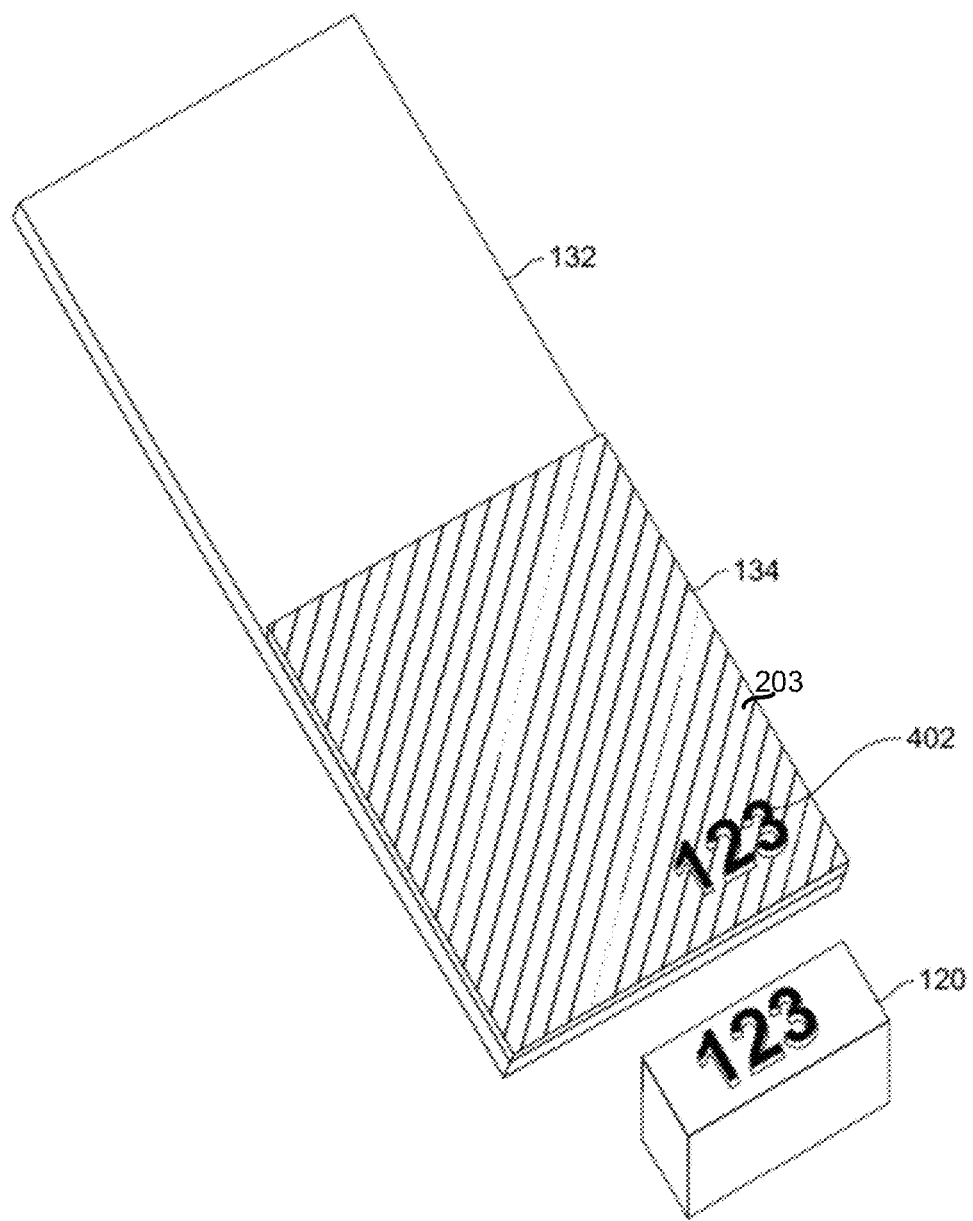
Figure 5:
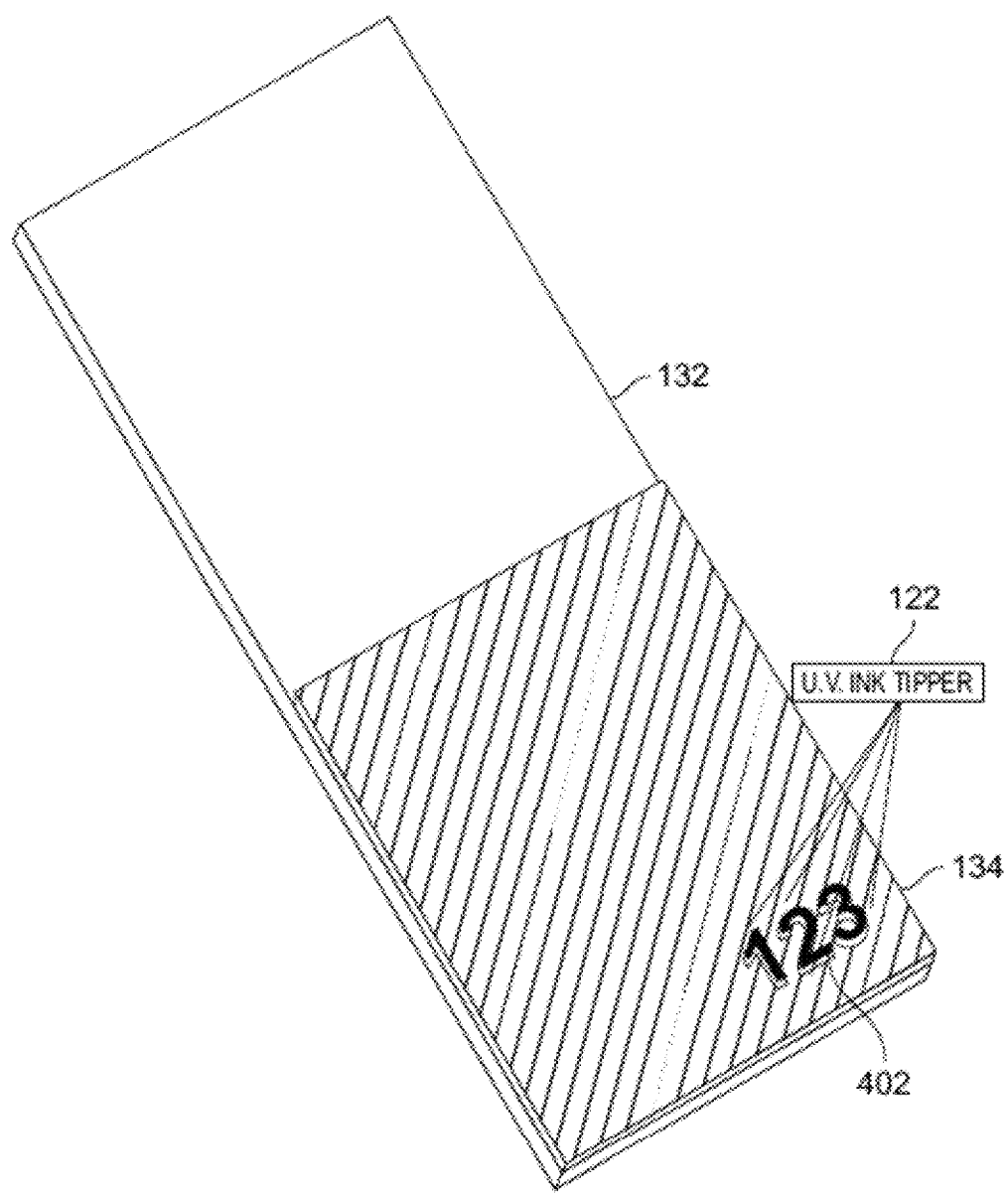

FIGS. 2-12 depict different views during a fabrication process to produce an example card 1200 in accordance with the teachings of this disclosure. FIG. 2 depicts glue 202 applied to a first portion 203 of a first surface 204 of the first substrate 132 and the second substrate 134 about to be coupled to the first portion 203. FIG. 3 depicts the first and second substrate 132, 134 after the first and second substrates 132, 134 are coupled and/or mated and FIG. 4 shows the embosser 120 embossing part of the first portion 203 such that an embossed area 402 protrudes from the second substrate 134. FIG. 5 shows the U.V. ink tipper 122 applying ink to the embossed area 402 to enable the embossed area 402 to be visually differentiated from the second substrate 134 surrounding the embossed area 402.

Figure 6:
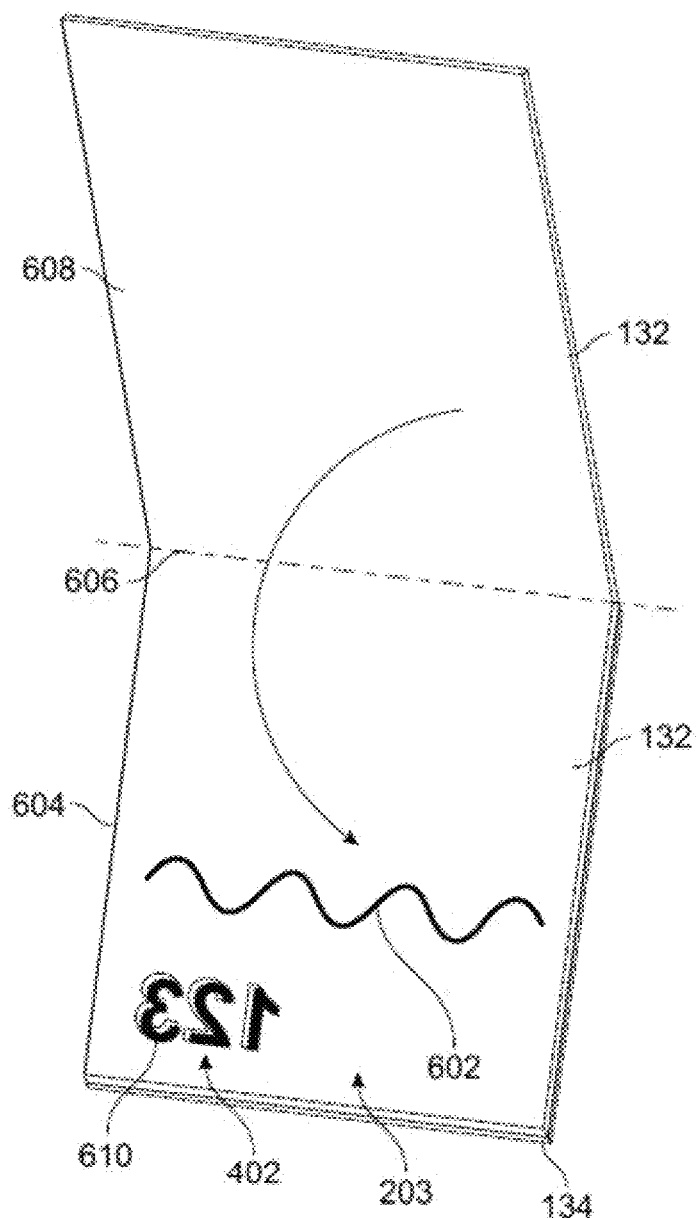
Figure 7:
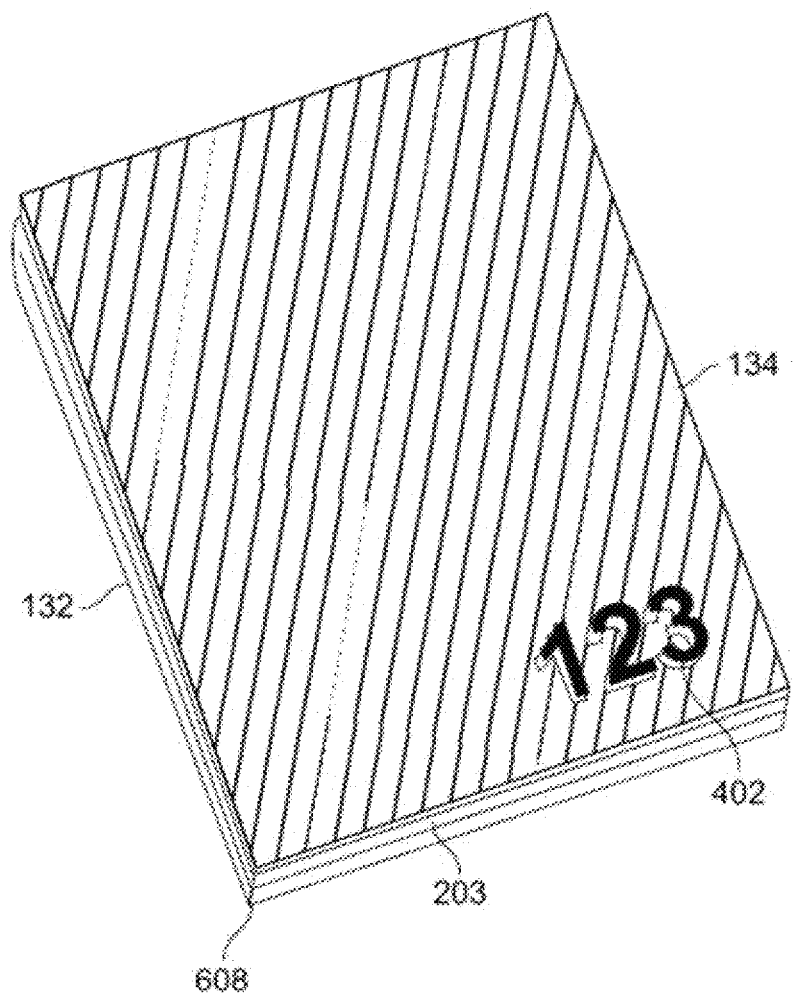

FIG. 6 shows glue 602 applied to a second surface 604 of the first substrate 132 and the first substrate 132 being folded about a first fold 606 such that the first portion 203 of the first substrate 132 is coupled to a second portion 608 of the first substrate 132 and an indentation 610 formed by the embossed area 402 is covered by the second portion 608. FIG. 7 shows the first and second portions 203, 608 coupled together and the embossed area 402.

Figure 8:
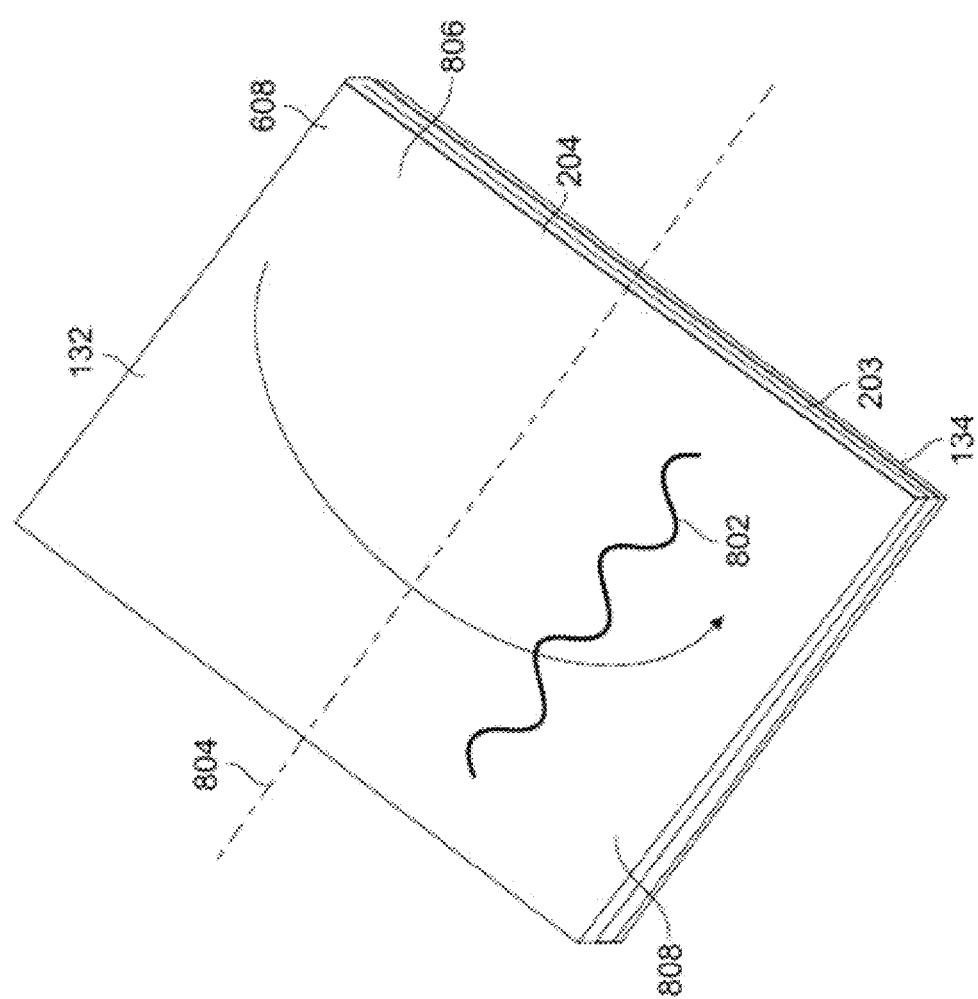
Figure 10:
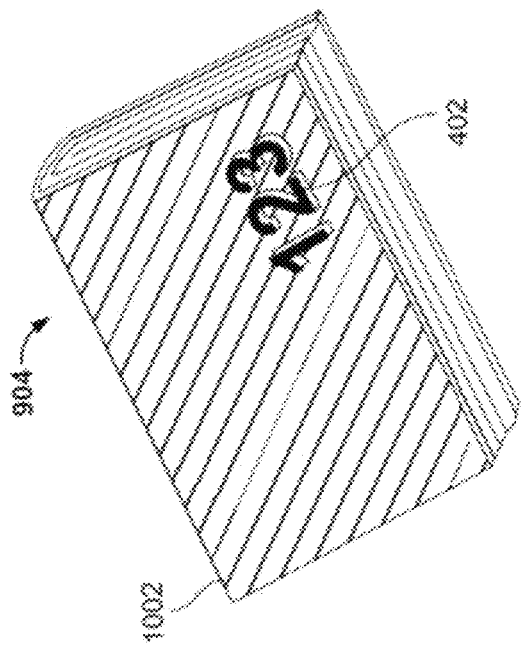
Figure 9:
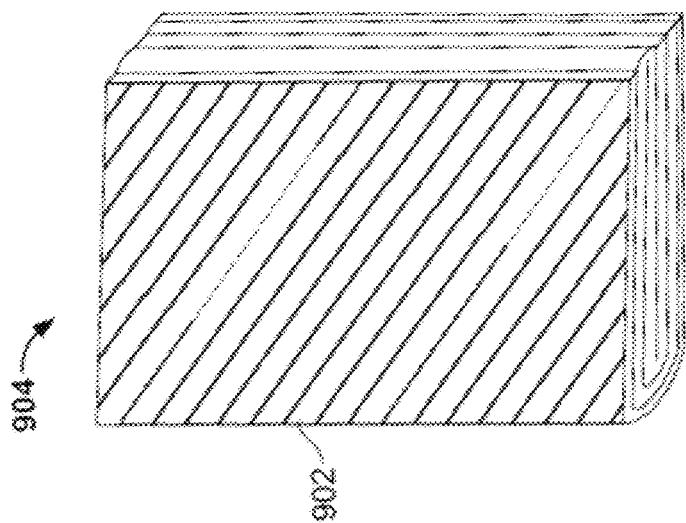
Figure 12:
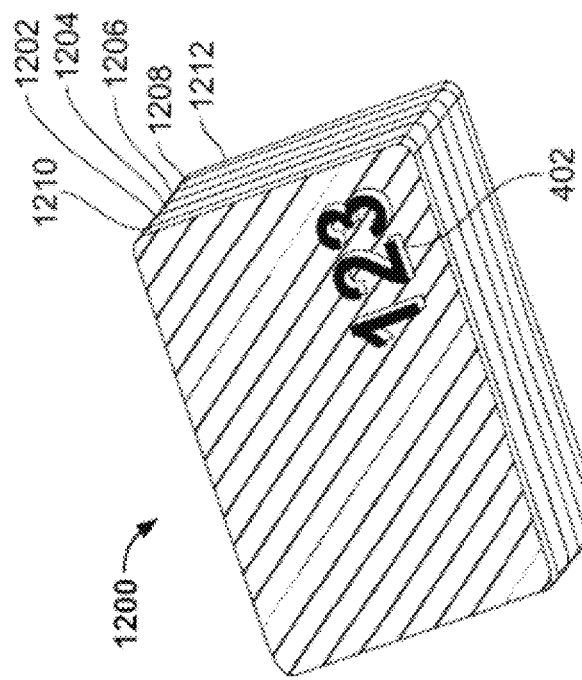
Figure 11:
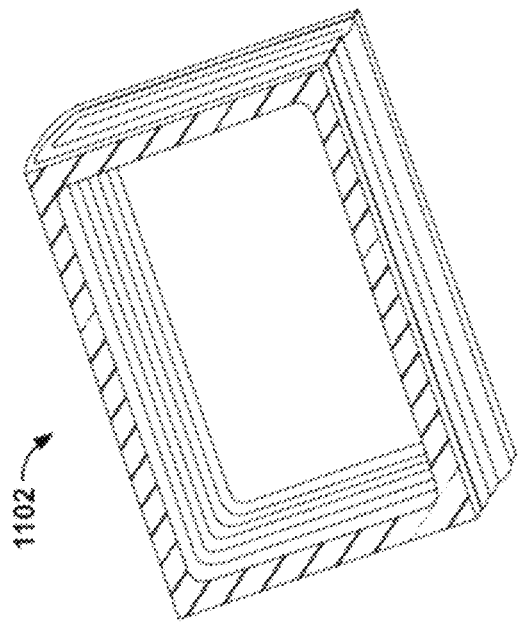

FIG. 8 shows glue 802 applied to the second portion 608 of the first surface 204 and the first and second substrates 132, 134 being folded about a second fold 804 such that a first half 806 of the second portion 608 is coupled to a second half 808 of the second portion 608. FIG. 9 shows a first and/or non-embossed side 902 of a form 904 and FIG. 10 shows a second and/or embossed side 1002 of the form 904 where the form 904 is to be die-cut to form the card 1200. FIG. 11 shows a waste matrix 1102 that surrounds the card 1200 prior to removal and FIG. 12 shows the card 1200 produced. As shown in FIG. 12, the card 1200 has first, second, third and fourth internal plies 1202, 1204, 1206, 1208 formed from the first substrate 132 and first and second external plies 1210, 1212 formed from the second substrate 134. In other examples, the card 1200 may have any number of internal plies and/or any number of external plies.

FIGS. 13 and 14 depict an example card and/or form 1300 in accordance with the teachings of this disclosure. In the illustrated example, the card 1300 includes first, second, third and fourth paper plies 1302, 1304, 1306, 1308 positioned between first and second poly plies 1310, 1312. While the example card 1300 is described as having four paper plies and two poly plies, the example forms disclosed herein may have any other number of paper plies (e.g., 1, 2, 3, 5, etc.) and/or poly plies (e.g., 1, 3, 4, etc.).

As discussed above, the card 1300 is formed by mating the paper web and/or the first substrate 132 and the poly web and/or the second substrate 134 and folding the mated webs of the substrates 132, 134 such that the poly web and/or the second substrate 134 forms the poly plies 1310, 1312 and the paper web and/or the first substrate 132 forms the paper plies 1302, 1304, 1306, 1308. During the first folding process performed by the first folder 126, the first paper ply 1302 is coupled to the second paper ply 1304 and the third paper ply 1306 is coupled to the fourth paper ply 1308. During the second folding process performed by the second folder 128, the second paper ply 1304 is coupled to the third paper ply 1306.

As shown in FIGS. 13 and 14, a first surface 1314 of the first paper ply 1302 includes imaging 1316 and the first paper and poly plies 1302, 1310 includes an embossed area 1318. Because the webs and/or the substrates 132, 134 are embossed prior to folding, no indentations are present on the second poly ply 1312. In examples in which the cards 1300 are packaged by stacking one card on top of the other, the second poly ply 1312 not having static embossing indentations prevents the cards 1300 from sticking to one another and/or being coupled together. In some examples, not having indentations on the back surface of the card 1300 opposite the embossed front surface enables the back surface to relatively easily receive indicia, be printed on and/or be viewed after embossing the front surface.

FIGS. 15 and 16 depict an example card 1500 in accordance with the teachings of this disclosure. In the illustrated example, the card 1500 includes first, second, third and fourth paper plies 1502, 1504, 1506, 1508 positioned between first and second poly plies 1510, 1512. In some examples, corners 1520, 1522, 1526, 1528 of the card 1500 are formed by die cutting and perforations 1518, 1519 are added to the card 1500 to enable an example sponsorship tag 1514 to be removed from a surrounding waste matrix 1516 and/or to define an aperture. As shown in FIG. 15, a first surface 1530 of the first paper ply 1502 includes imaging 1532 and the first paper and poly plies 1502, 1510 include an embossed area 1534.

Figure 17:
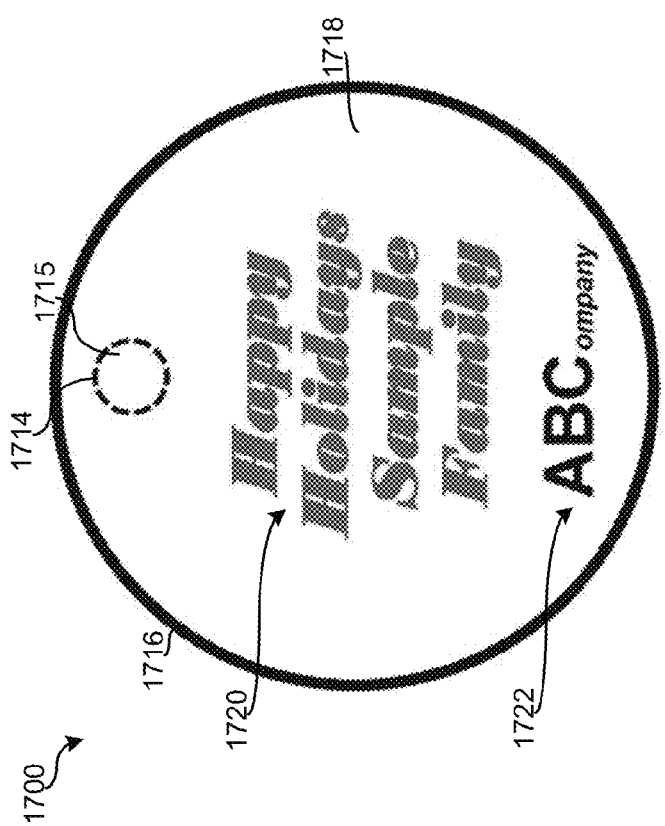
FIGS. 17 and 18 depict an example ornament and/or form in accordance with the teachings of this disclosure.
Figure 18:
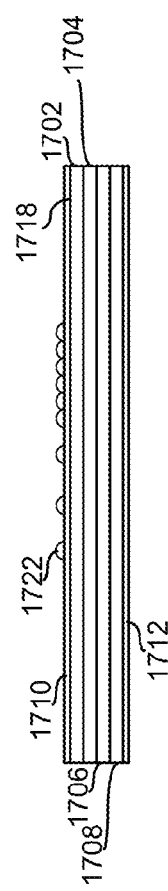

FIGS. 17 and 18 depict an example ornament and/or form 1700 in accordance with the teachings of this disclosure. In the illustrated example, the ornament 1700 includes first, second, third and fourth paper plies 1702, 1704, 1706, 1708 positioned between first and second poly plies 1710, 1712. In some examples, to enable the example ornament 1700 to be hung, a perforation 1714 is added to the ornament 1700 to define a cutout 1715. In some examples, a perimeter surface 1716 is formed by die cutting. As shown in FIG. 17, a first surface 1718 of the first paper ply 1702 includes imaging 1720 and the first paper and poly plies 1702, 1710 include an embossed area 1722. In this example, the imaging 1720 identifies a family name and the embossed area 1722 identifies a name of a company.

FIGS. 19 and 20 depict an example luggage tag and/or form 1900 in accordance with the teachings of this disclosure. In the illustrated example, the tag 1900 includes first, second, third and fourth paper plies 1902, 1904, 1906, 1908 positioned between first and second poly plies 1910, 1912. In some examples, to enable the example tag 1900 to be coupled to a piece of luggage, a perforation 1913 defines a cutout 1914.

As shown in FIG. 19, a first surface 1918 of the first paper ply 1902 includes imaging 1920 and the first paper and poly plies 1902, 1910 include an embossed area 1922. In this example, the imaging 1920 is used to include personal information on the tag (e.g., a person's name, etc.) and the embossed area 1922 identifies a name of a company.

Figure 21:
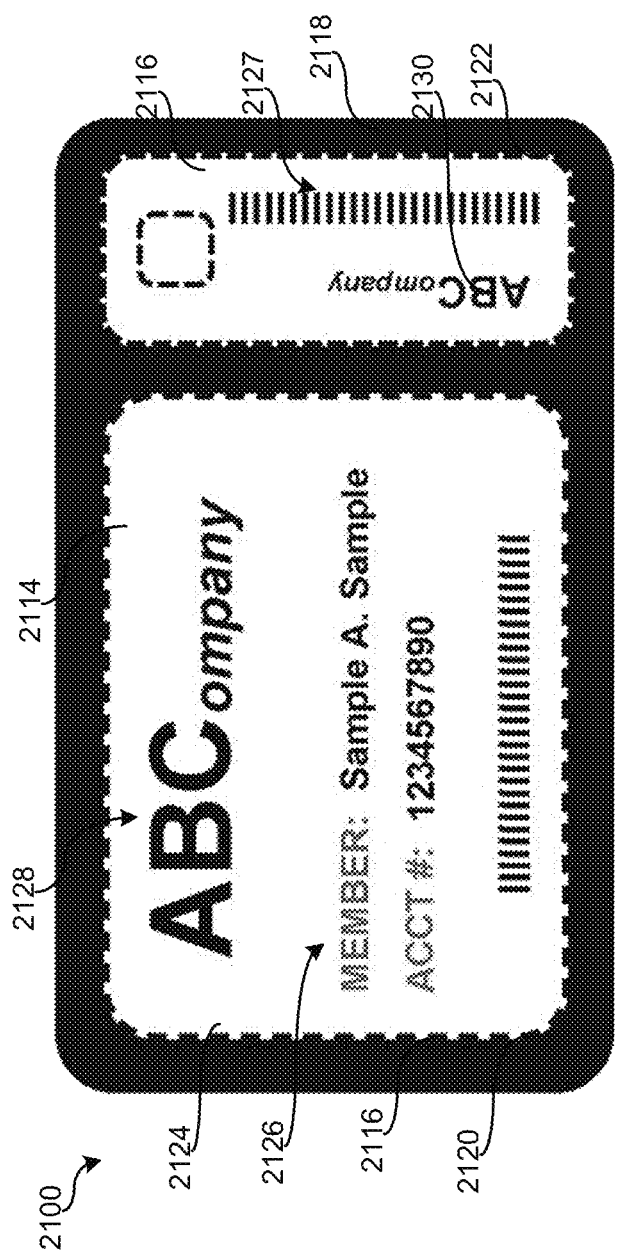
FIGS. 21 and 22 depict an example card and key tag and/or form in accordance with the teachings of this disclosure.
Figure 22:
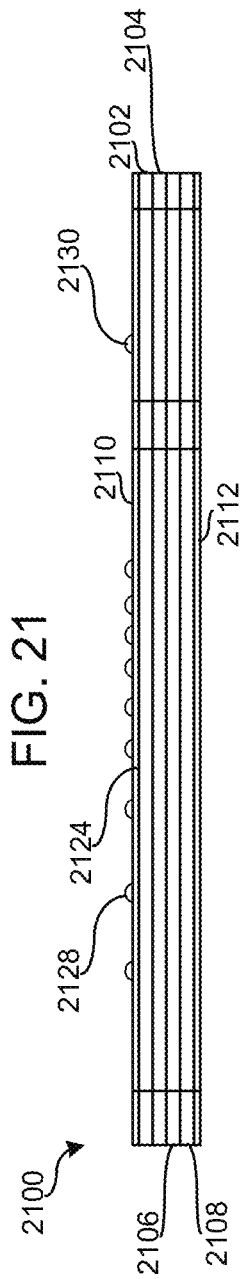

FIGS. 21 and 22 depict an example card and/or form 2100 in accordance with the teachings of this disclosure. In the illustrated example, the form 2100 includes first, second, third and fourth paper plies 2102, 2104, 2106, 2108 positioned between first and second poly plies 2110, 2112. In this example, the form 2100 includes a card 2114 and a tag 2116. To enable the card 2114 and the tag 2116 to be removed from a surrounding waste matrix 2118, the form 2100 defines perforations 2120, 2122.

As shown in FIG. 21, a first surface 2124 of the first paper ply 2102 includes imaging 2126, 2127 and the first paper and poly plies 2102, 2110 include an embossed area 2128, 2130. In this example, the imaging 2126, 2127 is used to include personal information on the form (e.g., a person's name, etc.) and/or a barcode and the embossed area 2128, 2130 identifies a name of a company.

Figure 23:
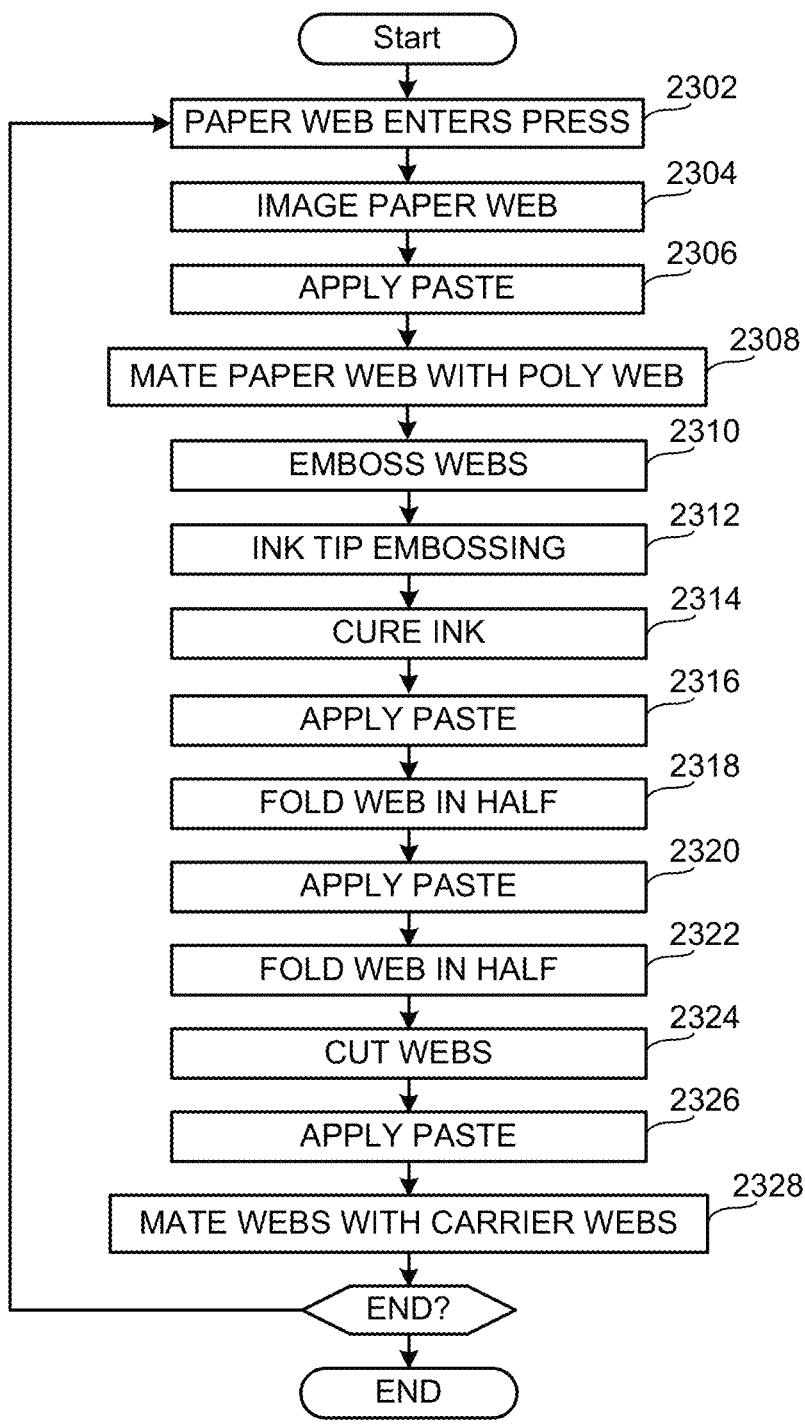
FIG. 23 is a flowchart representation of an example process, which may be implemented using machine readable instructions, to produce the example forms of FIGS. 2-22.

FIG. 23 depicts an example flow diagram representative of a process that may be implemented using, for example, computer readable instructions that may be carried out in conjunction with paper processing equipment such as die cutters, web presses, etc. to produce the forms disclosed herein and/or any other of the examples disclosed herein.

The example processes of FIG. 23 may be performed using a processor, a controller and/or any other suitable processing device. For example, the example processes of FIG. 23 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process of FIG. 23 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 23 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 23 may be implemented manually or as any combination(s) of any of the foregoing techniques, for example, any combination of firmware, software, discrete logic and/or hardware. Further, although the example processes of FIG. 23 are described with reference to the flow diagram of FIG. 23, other methods of implementing the processes of FIG. 23 may be employed. For example, the order of execution of the blocks may be changed, and/or some of the blocks described may be changed, eliminated, sub-divided, or combined. Additionally, any or all of the example processes of FIG. 23 may be performed sequentially and/or in parallel by, for example, separate processing threads, processors, devices, discrete logic, circuits, etc.

FIG. 23 represents an example method of producing the examples disclosed herein. While the processes of the method are depicted as being performed sequentially, one or more of the processes may be performed in parallel, for example. The process may begin by unwinding a substrate and/or paper substrate from a roll and/or moving one or more pieces of the paper substrate into a press and toward an imager that images the paper substrate (blocks 2302, 2304). In some examples, the imager images a portion of a first side of the paper substrate. The images may include brand-related images and/or text, instructional images and/or text, personal information, a barcode, etc. In some examples, glue and/or paste may be applied to the imaged portion and/the first side of the paper substrate and a poly web and/or substrate may be mated therewith (blocks 2306, 2308). In some such examples, the poly substrate covers approximately one half of the paper substrate (e.g., over the glued portion) and the glue is substantially clear when dried.

In some examples, the mated substrates may pass through an embosser that embosses the mated substrates. (block 2310). The embosser may be a static embosser and/or a variable embosser that embosses a number(s), a name(s), etc. on a portion of the substrates. In some examples, the embossed area is ink tipped and cured. (blocks 2312, 2314). The ink tipping enables the embossed area to stand out and/or be more visible.

In some examples, paste and/or glue is applied to a second side of the paper substrate (e.g., opposite the side where the poly substrate is coupled) and then the paper substrate is folded in half such that the second side of the paper substrate is coupled together. (blocks 2316, 2318). In some examples, paste and/or glue is then applied to the first side of the paper substrate (e.g., the half of the first side not covered by the poly substrate) and then the paper and poly substrates are folded in half such that the first side of the paper substrate is coupled together and the poly substrate forms the front and the back of the form. (blocks 2320, 2322).

In some examples, to complete the process of producing the example form, a die cutter may cut the form from a surrounding matrix and/or produce one or more lines of weakness through the form. (block 2324). In some examples, the lines of weakness are perforations that define a cutout. The forms produced may then be mated with another web and/or carrier web using paste and/or glue (blocks 2326, 2328). The carrier web may be used to form a mailer, a mailer insert, a form, etc.

Figure 24:
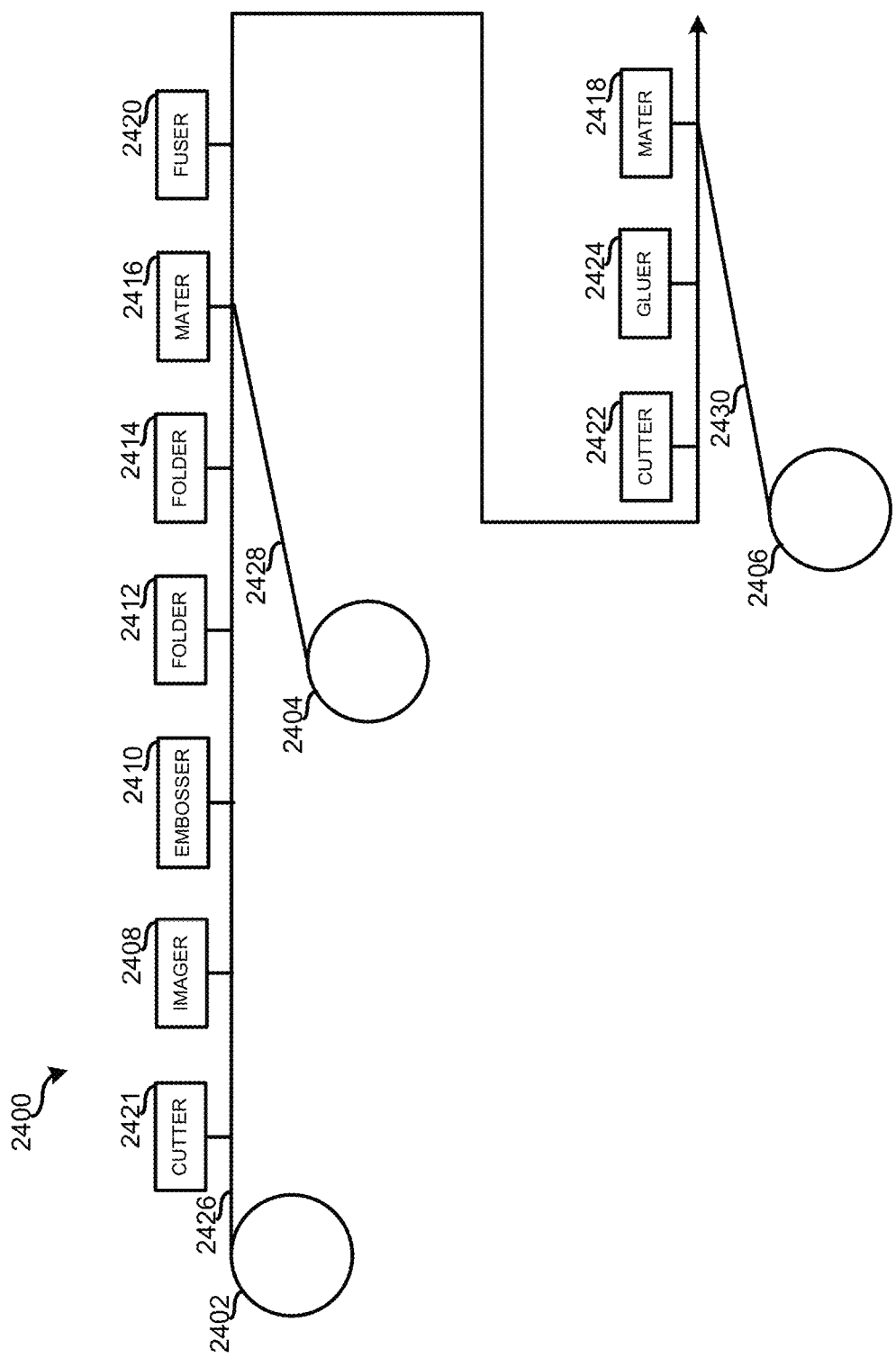
FIG. 24 depicts an example apparatus that can be used to produce an example multi-layer forms disclosed herein.

FIG. 24 represents an example apparatus 2400 that can be used to implement the processes disclosed herein to produce the example cards, tags, forms, etc. In some examples, the apparatus 2400 may be an in-line process and includes first, second and third substrate movers 2402, 2404, 2406; an imager (e.g., a variable imager) 2408; an embosser 2410; folders 2412, 2414; maters 2416, 2418; a fuser 2420; cutters 2421, 2422; and a gluer 2424. While the stations and/or portions 2402-2424 of the apparatus 2400 are depicted in a particular order, the stations and/or portions 2402-2424 may be arranged differently and/or one or more of the stations and/or portions 2402-2424 may be removed and/or combined.

In some examples, during operation, the first substrate mover 2402 feeds one or more pieces of first substrate and/or a web of first substrate 2426 into the apparatus 2400. In some examples, the first substrate 2426 is PET and/or any other suitable type of plastic that may or may not have intelligent inlays coupled thereto. In examples in which the first substrate 2426 includes inlays (e.g., RFID tags, NFC tags) coupled thereto, the cutter 2421 may die cut the first substrate to form a plurality of holes and/or apertures into which the chips of the inlays are to be positioned after the first substrate 2426 is folded during the production process to enable the form and/or card produced to be substantially flat, have a substantially consistent thickness and/or not have a bulge formed by the inlay. In some examples, the imager 2408 images a first side of the first substrate 2426. The images may include personal information (e.g., a name, an address, etc.), brand-related images and/or text, advertisement related images and/or text, instructional images and/or text, etc. However, in other examples, the apparatus 2400 does not include the imager 2408 and, thus the first substrate 2426 is imaged at a different location (e.g., the first substrate 2426 is pre-imaged) and/or the first substrate 2426 is not imaged.

The embosser 2410 receives and embosses the first substrate 2426. In some examples, the embosser 2410 is a static embosser that embosses a name, a number, etc. on the first substrate 2426. In other examples, the embosser 2410 is a variable embosser that embosses text (e.g., a person's name) and/or a variable number (e.g., a credit card number) on the first substrate 2426.

The first folder 2412 may fold the first substrate 2426 in half along a first fold such that a second surface of the first substrate 132 is immediately adjacent each other. The second folder 2414 may fold the first substrate 2426 in half along a second fold line such that the first surface of the first substrate 2426 is immediately adjacent each other. The mater 2416 may mate a second substrate (e.g., poly) 2428 with the opposing exterior surfaces of the folded first substrate 2426 and the fuser 2420 may fuse the substrates 2426, 2428 together to form a card, tag and/or form. In some examples, the fuser 2420 heat fuses and/or plastic welds the substrates 2426, 2428 together.

The cutter 2422 may round the corners of the card, tag and/or form being produced, add one or more lines of weakness to the card, tag and/or form and/or cut and/or remove a waste matrix surrounding the card, tag and/or form being produced. In some examples, the gluer 2424 may apply glue to a back surface of the completed card, tag and/or form (e.g., the smooth back surface opposite the embossed front surface) and the mater 2418 may mate the completed card, tag and/or form with a third substrate 2430. The third substrate 2430 may be a carrier web used to produce a mailer, a mailer insert, a form, etc.

Figure 25:
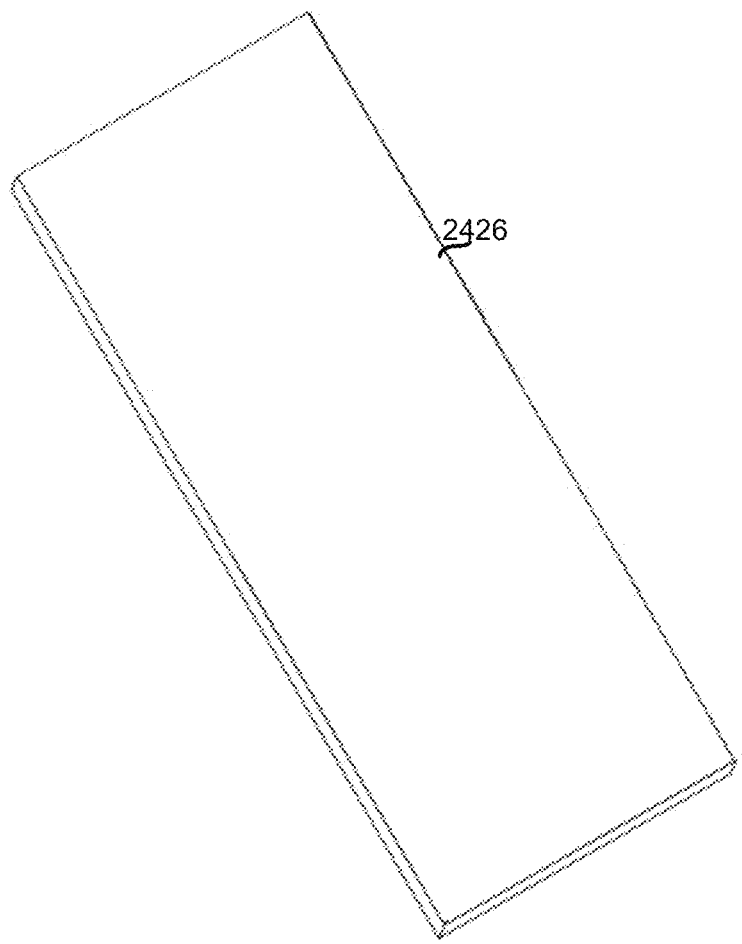
FIGS. 25-35 depict an example multi-layer form at various stages of an example production process.
Figure 26:
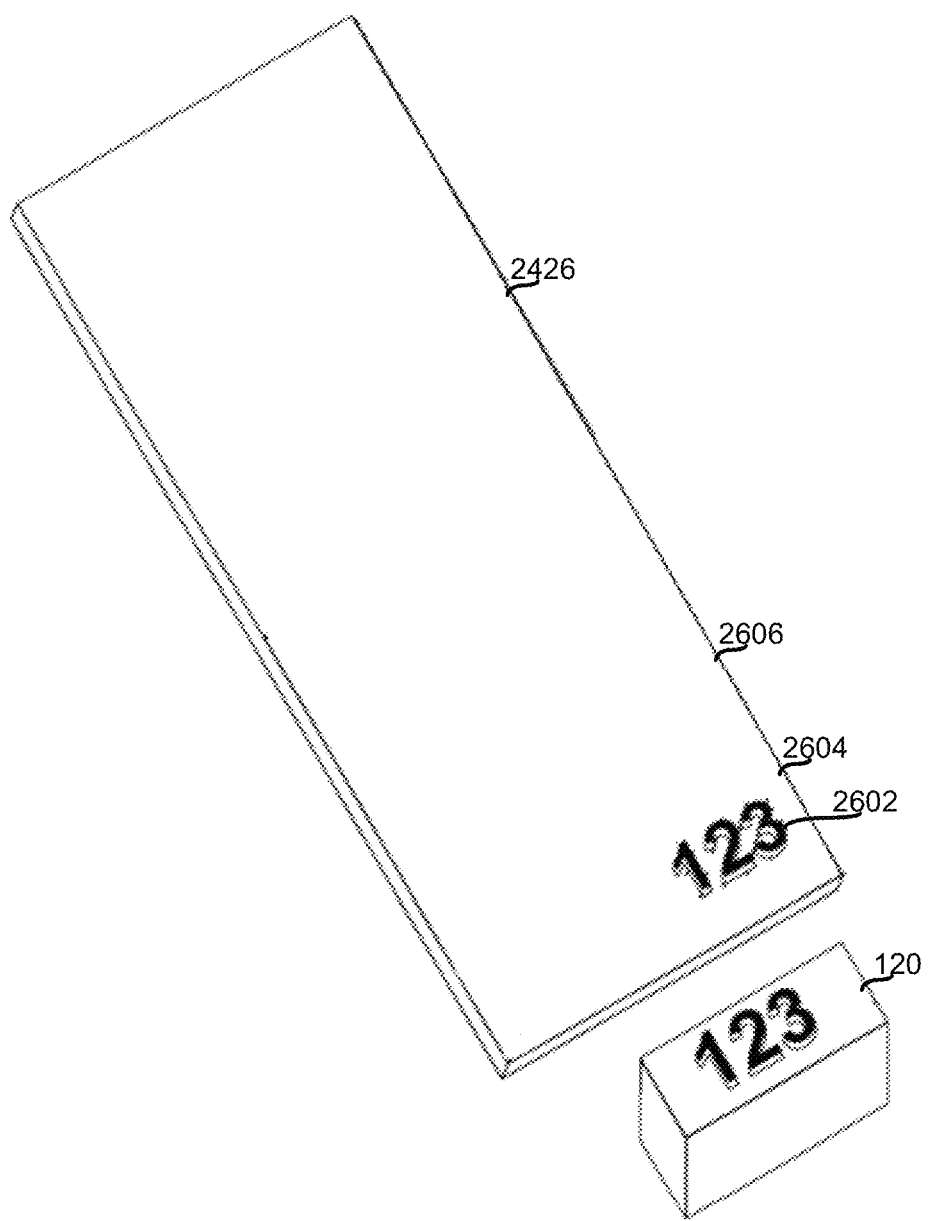

FIGS. 25-35 depict different views during a fabrication process to produce an example card 3500 in accordance with the teachings of this disclosure. FIG. 25 depicts the first substrate 2426 and FIG. 26 shows the embosser 120 an embossed area 2602 part of a first portion 2604 of the first substrate 2604 such that the embossed area 2602 protrudes from a first side 2606 of the first substrate 2426.

Figure 27:
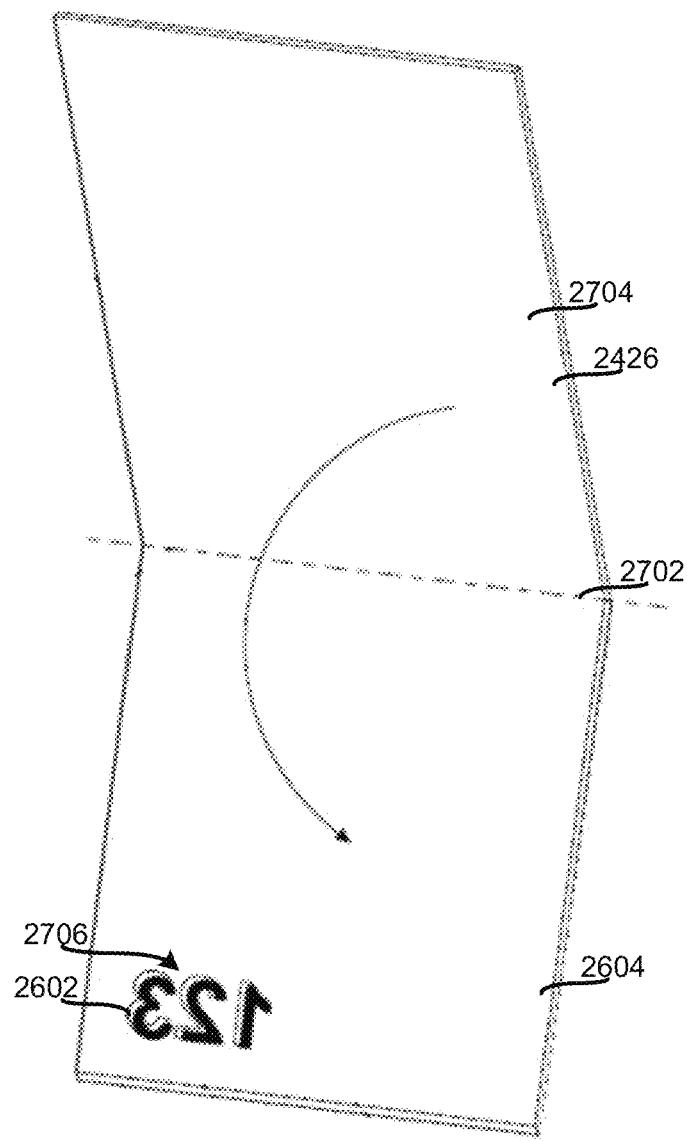
Figure 28:
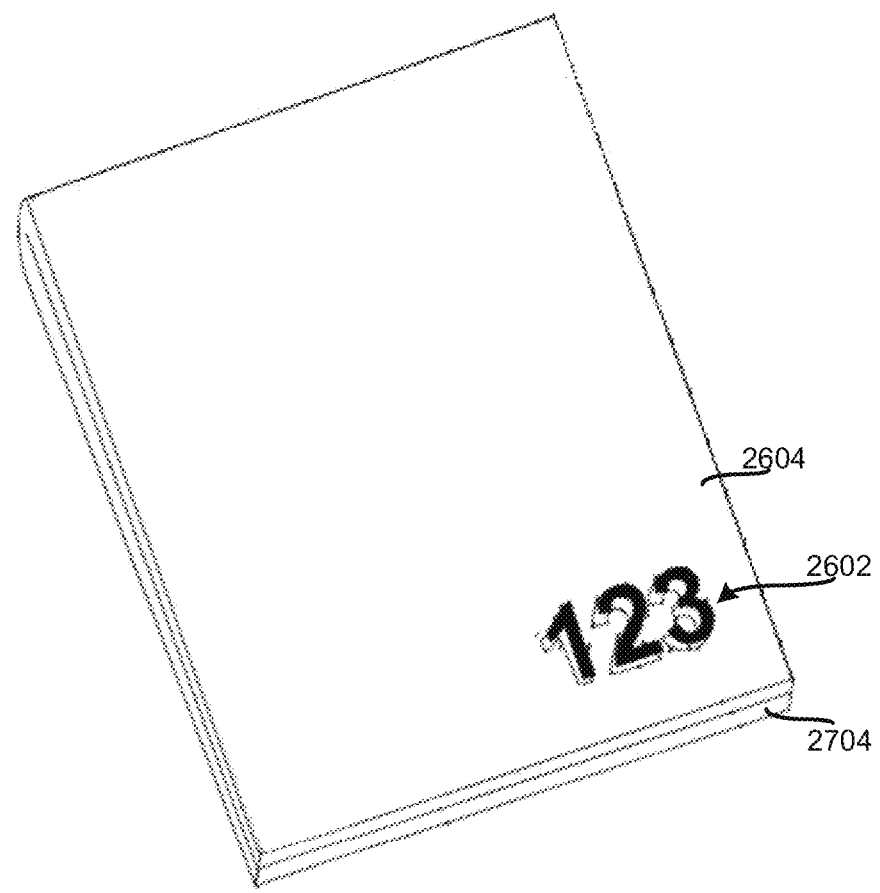

FIG. 27 shows the first substrate 2426 being folded about a first fold 2702 such that the first portion 2604 of the first substrate 2426 is adjacent to a second portion 2704 of the first substrate 2426 and an indentation 2706 formed by the embossed area 2602 is covered by the second portion 2704. FIG. 28 shows the first and second portions 2604, 2704 immediately adjacent one another and the embossed area 2602.

Figure 29:
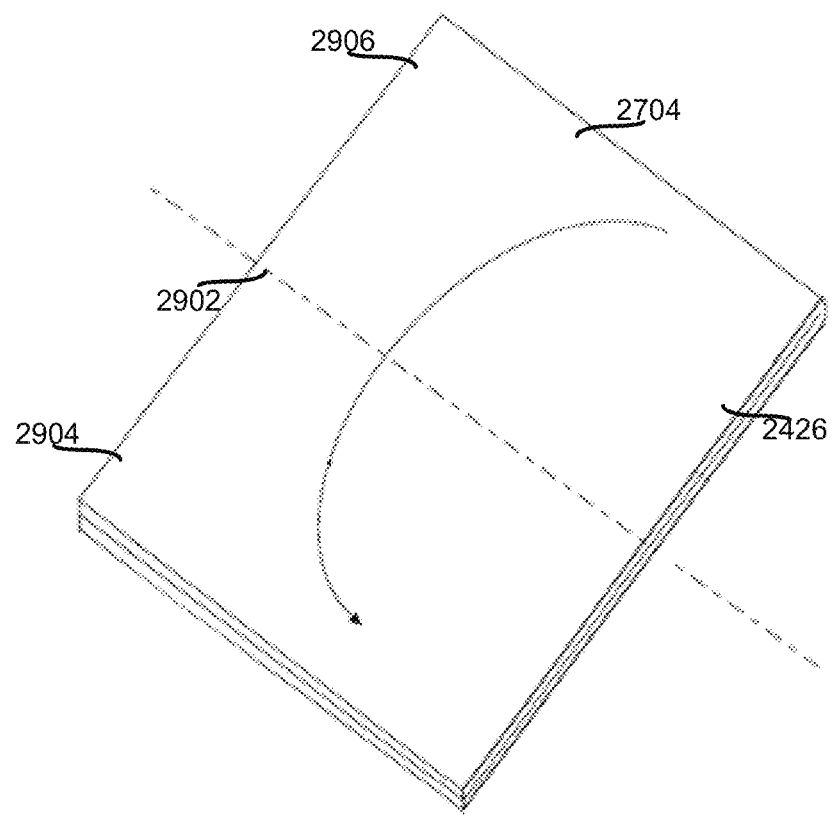
Figure 30:
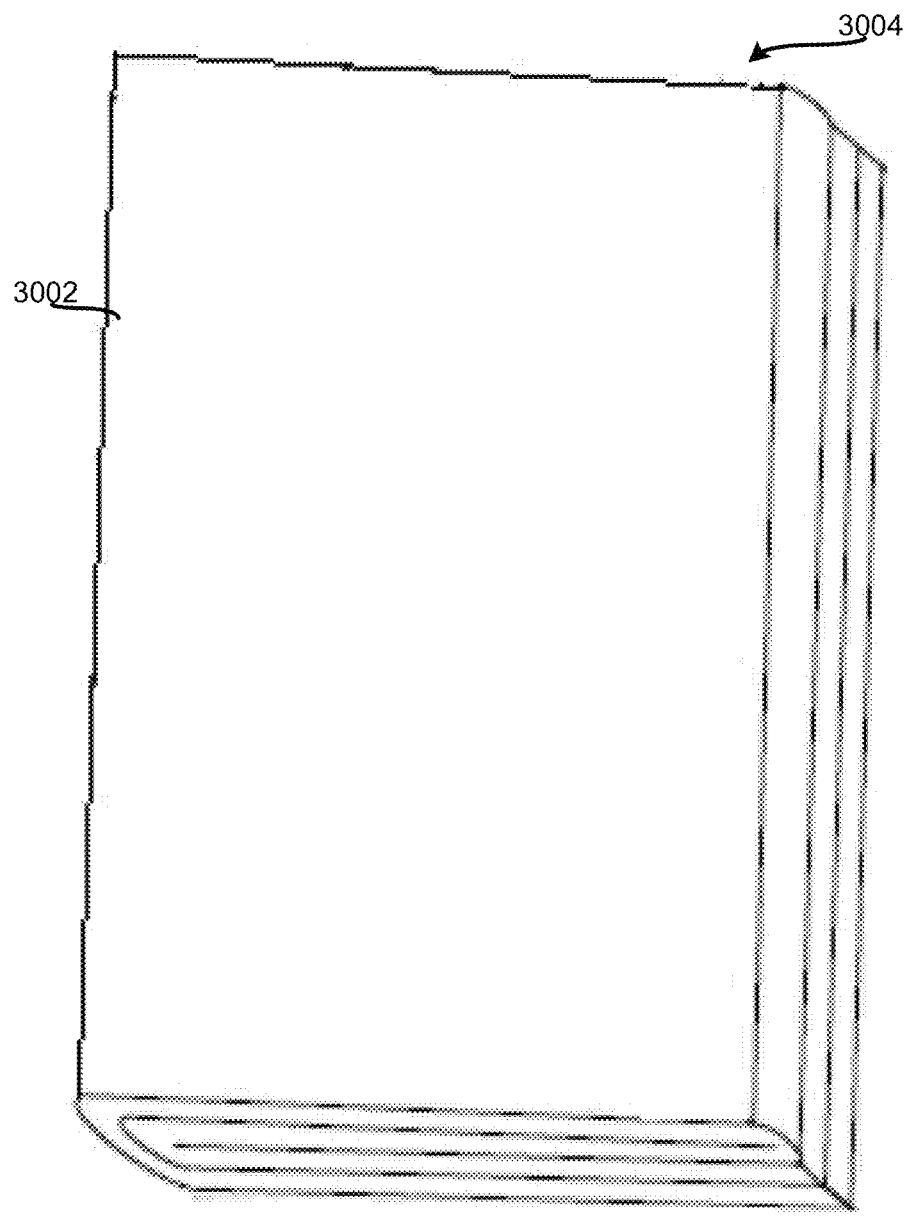
Figure 31:
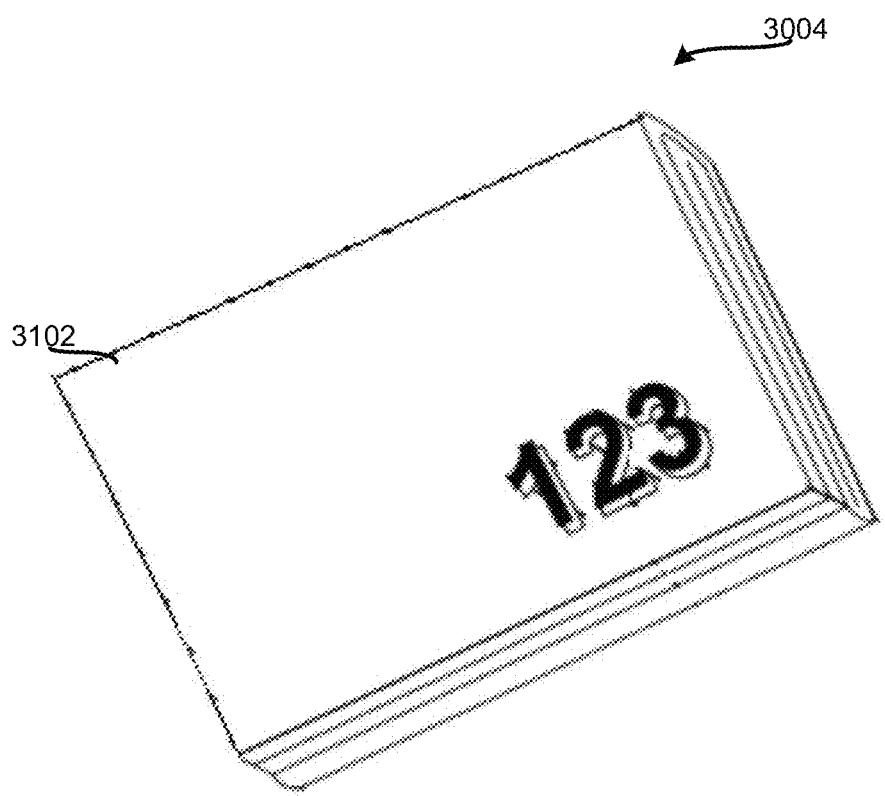
Figure 32:
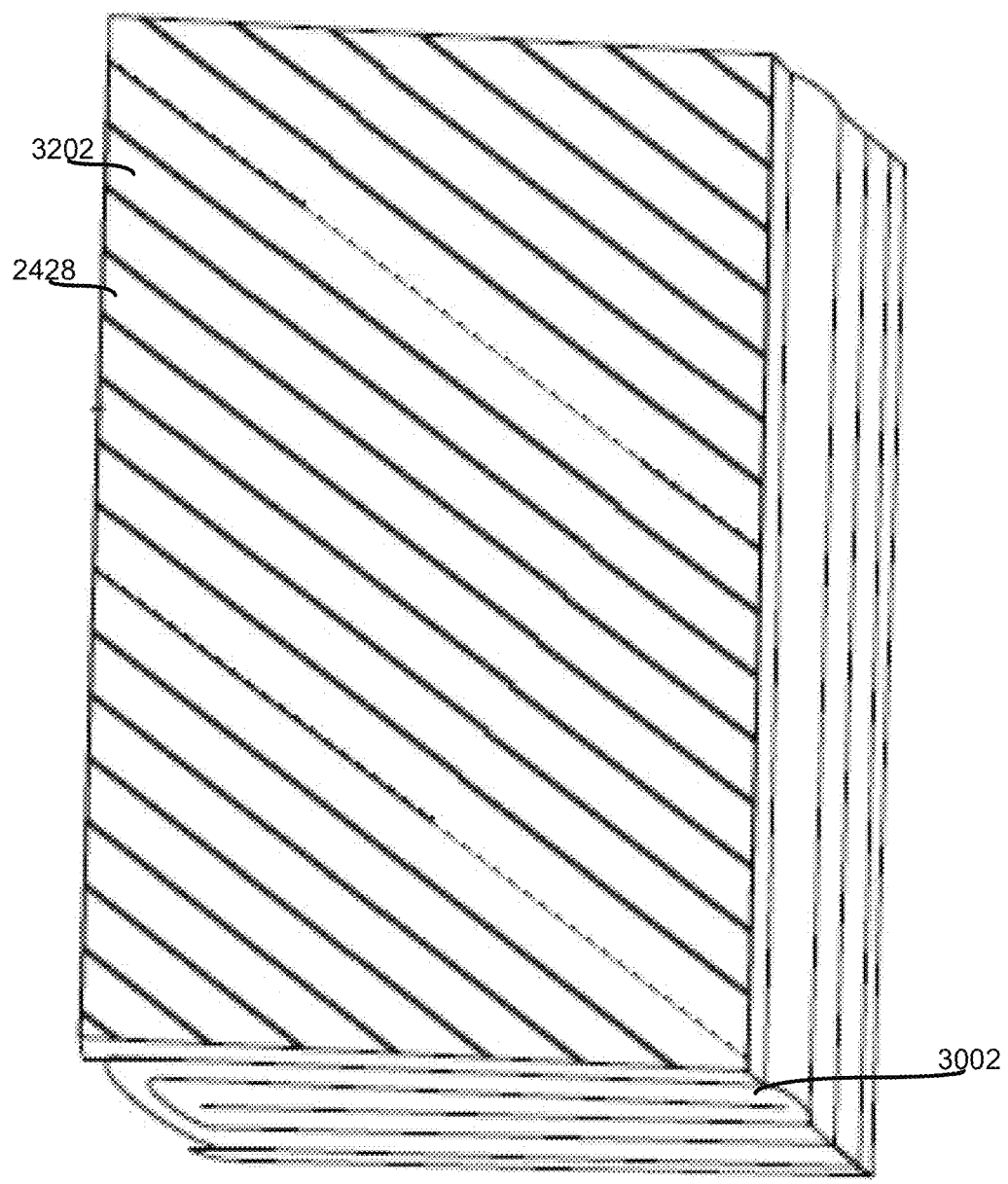
Figure 33:
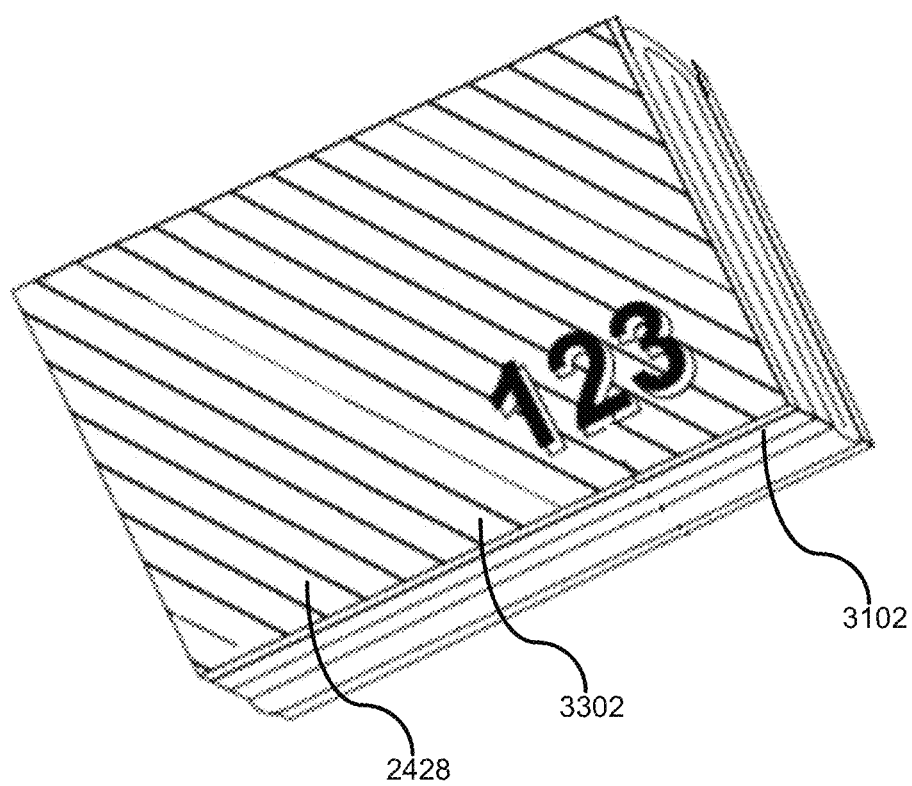

FIG. 29 shows the first substrate 2426 being folded about a second fold 2902 such that a first half 2904 of the second portion 2704 is adjacent a second half 2906 of the second portion 2704. FIG. 30 shows a first and/or non-embossed side 3002 of a form 3004 and FIG. 31 shows a second and/or embossed side 3102 of the form 3004 where the form 3004 is to be die-cut to form the card 3500. FIG. 32 shows a first portion 3202 of the second substrate 2428 coupled to the first and/or non-embossed side 3002 of the first substrate 2426 and FIG. 33 shows a second portion 3302 of the second substrate 2428 coupled to the second and/or embossed side 3102 of the first substrate 2426.

Figure 34:
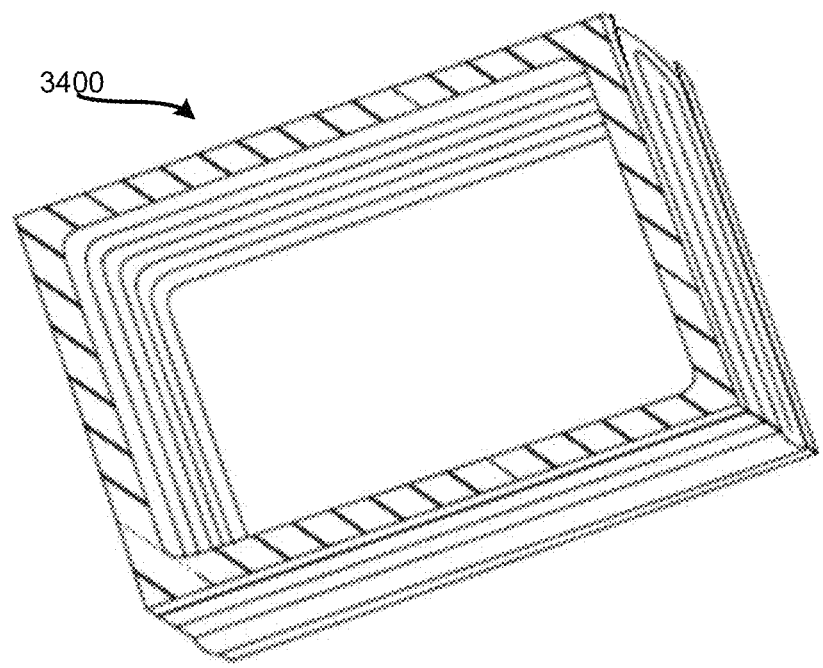
Figure 35:
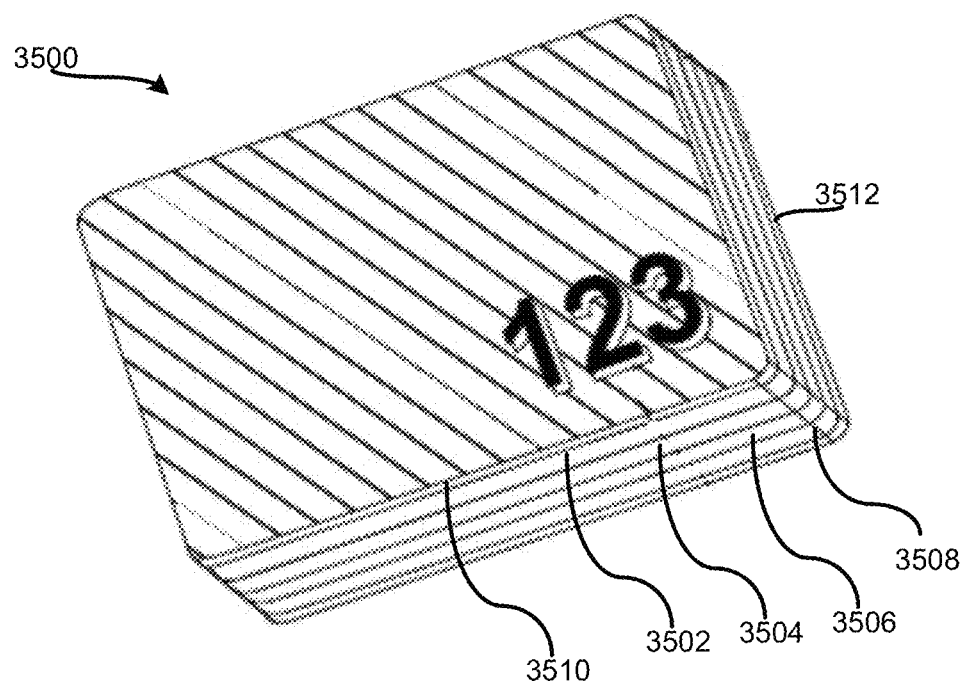

FIG. 34 shows a waste matrix 3400 that surrounds the card 3500 prior to removal and FIG. 35 shows the card 3500 produced. As shown in FIG. 35, the card 3500 has first, second, third and fourth internal plies 3502, 3504, 3506, 3508 formed from the first substrate 2426 and first and second external plies 3510, 3512 formed from the second substrate 2428. In other examples, the card 3500 may have any number of internal plies and/or any number of external plies. For example, in some examples, the card 3500 does not include the external 3510, 3512. In such examples, the card 3500 is made of the first substrate 2426.

Figure 36:
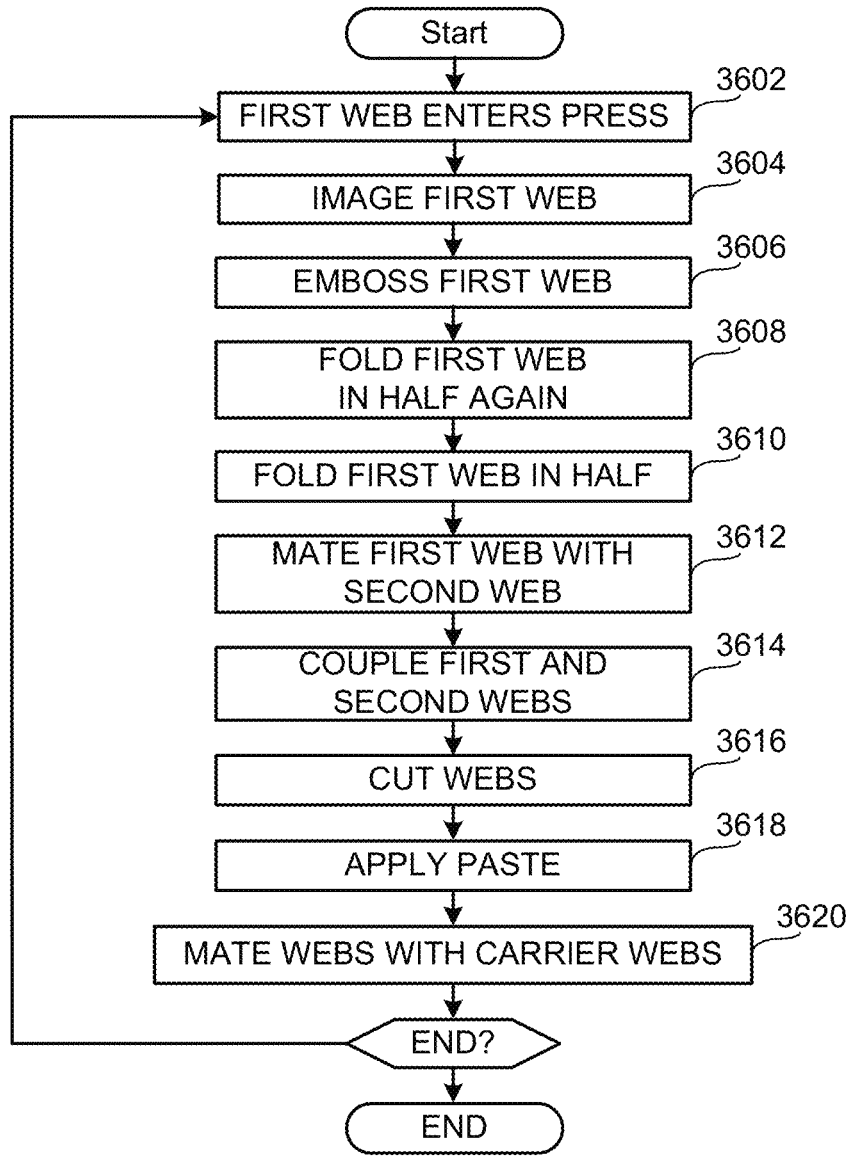
FIG. 36 is a flowchart representation of an example process, which may be implemented using machine readable instructions, to produce the example forms of FIGS. 13-22 and 25-35.

FIG. 36 depicts an example flow diagram representative of a process that may be implemented using, for example, computer readable instructions that may be carried out in conjunction with paper processing equipment such as die cutters, web presses, etc. to produce the forms disclosed herein and/or any other of the examples disclosed herein. The example processes of FIG. 36 may be performed using a processor, a controller and/or any other suitable processing device. For example, the example processes of FIG. 36 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process of FIG. 36 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 36 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 36 may be implemented manually or as any combination(s) of any of the foregoing techniques, for example, any combination of firmware, software, discrete logic and/or hardware. Further, although the example processes of FIG. 36 are described with reference to the flow diagram of FIG. 36, other methods of implementing the processes of FIG. 36 may be employed. For example, the order of execution of the blocks may be changed, and/or some of the blocks described may be changed, eliminated, sub-divided, or combined. Additionally, any or all of the example processes of FIG. 36 may be performed sequentially and/or in parallel by, for example, separate processing threads, processors, devices, discrete logic, circuits, etc.

FIG. 36 represents an example method of producing the examples disclosed herein. While the processes of the method are depicted as being performed sequentially, one or more of the processes may be performed in parallel, for example. The process may begin by unwinding a first substrate and/or plastic/PET substrate from a roll and/or moving one or more pieces of the plastic and/or PET substrate into a press and toward a cutter that forms chip receiving apertures in the first substrate and an imager that images the plastic substrate (blocks 3602, 3604). In some examples, the imager images a portion of a first side of the first substrate. The images may include brand-related images and/or text, instructional images and/or text, personal information, a barcode, etc.

In some examples, the first substrate passes through an embosser that embosses the first substrate. (block 3606). The embosser may be a static embosser and/or a variable embosser that embosses a number(s), a name(s), etc. on a portion of the substrate.

In some examples, the first substrate is folded in half such that the second side of the first substrate is immediately adjacent one another. (block 3608). In some examples, the first substrate is folded in half again such that the first side of the first substrate is immediately adjacent one another. (block 3610).

In some examples, the first substrate is mated with the second substrate and/or the poly web and the first and substrates are coupled together. (blocks 3612, 3614). In some examples, the second substrate includes a bar code, a magnetic strip, etc. to enable, for example, the card produced to be used as a credit card, an access card, an identification card and, more generally, to include and/or convey information. In some examples, the substrates are coupled together by fusing the layers of the first substrate together and/or fusing the first and second substrates together. In some examples, to complete the process of producing the form, a die cutter may cut the form from a surrounding matrix and/or produce one or more lines of weakness through the form. (block 3616). In some examples, the lines of weakness are perforations that define a cutout. The forms produced may then be mated with another web and/or carrier web using paste and/or glue (blocks 3618, 3620). The carrier web may be used to form a mailer, a mailer insert, a form, etc.

Figure 37:
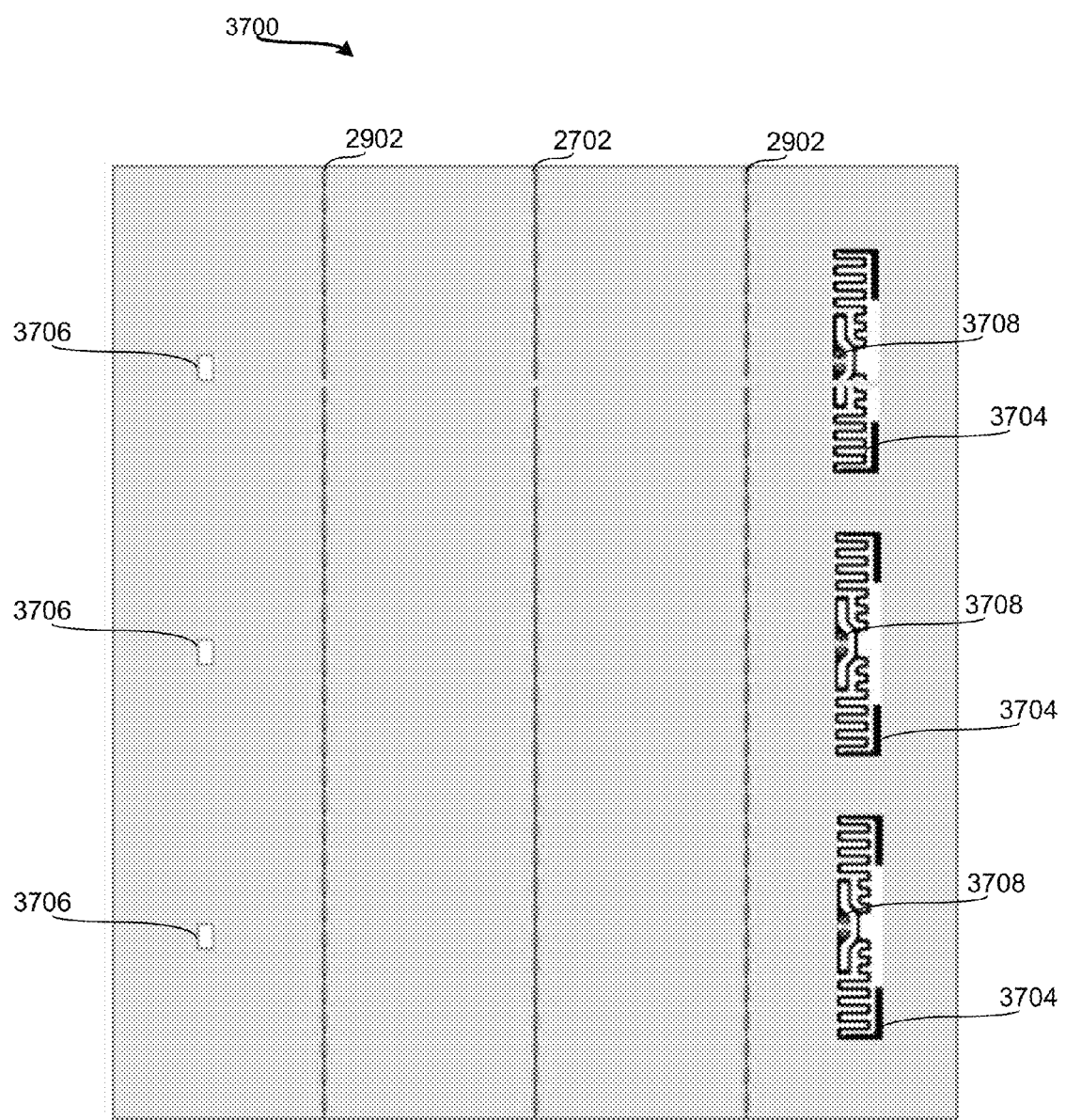
FIG. 37 shows an example web that can be used to produce the example multi-layer forms disclosed herein.

FIG. 37 depicts an example substrate 3700 that can be used to produce the example card 3500. As shown, the substrate 3700 includes the fold lines 2702, 2902, inlays 3704 and apertures 3706. In practice, once the substrate 3700 is folded about the fold line 2702, chips 3708 of the inlays 3704 are received within the apertures 3706 to substantially ensure the card 3500 produced has a substantially consistent thickness and/or to substantially prevent the chips 3708 from being damaged (e.g., the chips 3708 are substantially housed within the respective aperture 3706, thereby protecting the chips 3708). In examples in which the chips 3708 are relatively thick and/or thicker than the substrate 3700, more than one aperture 3706 may be defied such that when the substrate 3700 is folded about the fold line 2702, the respective chips 3708 are received in two or more apertures 3706.

Figure 38:
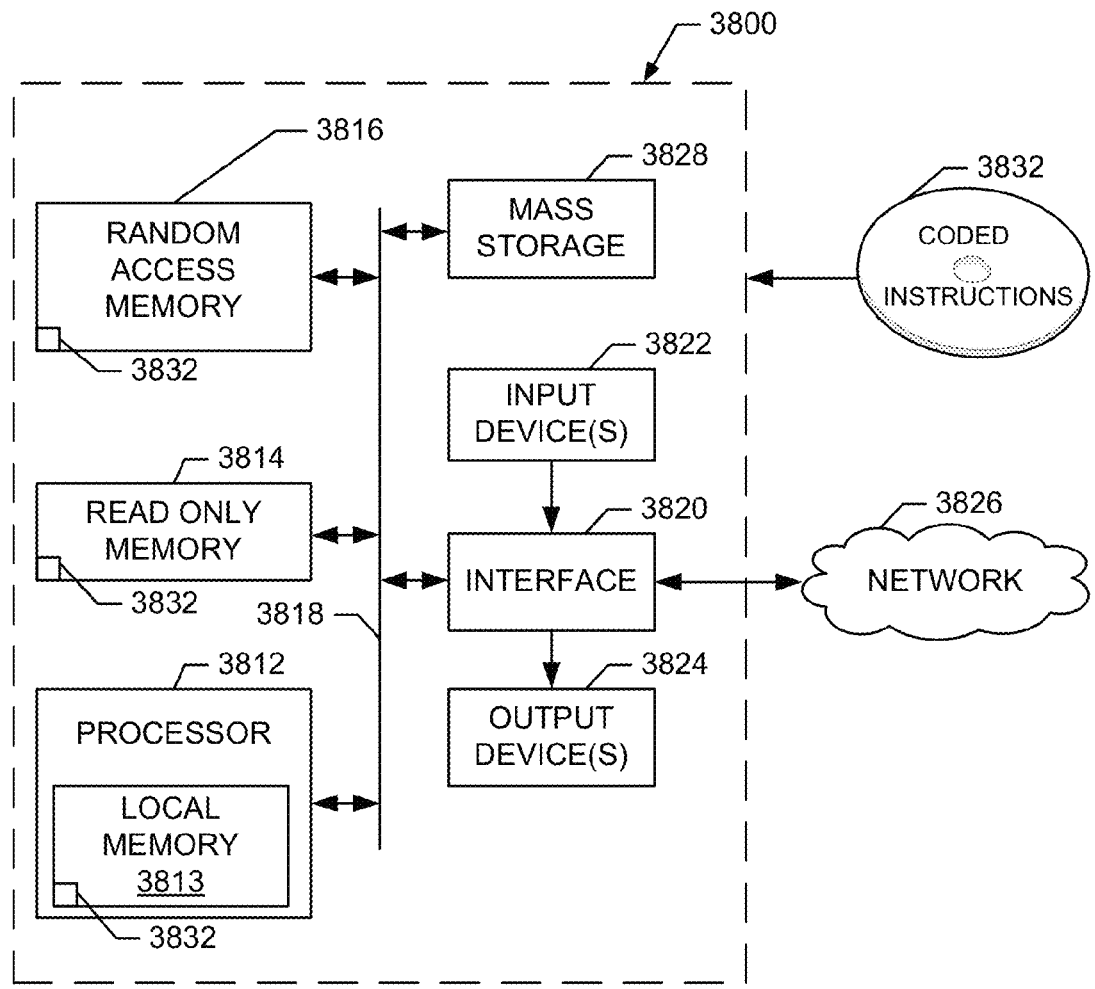
FIG. 38 is a block diagram of an example processor platform capable of executing the instructions to implement the flowcharts f FIGS. 23 and 36 to implement the apparatus of FIGS. 1 and 24.

FIG. 38 is a block diagram of an example processor platform 3800 capable of executing the instructions of FIGS. 23, 36 to implement the apparatus 100 of FIGS. 1, 24. The processor platform 3800 can be, for example, a server or any other type of computing device.

The processor platform 3800 of the illustrated example includes a processor 3812. The processor 3812 of the illustrated example is hardware. For example, the processor 3812 can be implemented by one or more integrated circuits, logic circuits, microprocessors or controllers from any desired family or manufacturer.

The processor 3812 of the illustrated example includes a local memory 3813 (e.g., a cache). The processor 3812 of the illustrated example is in communication with a main memory including a volatile memory 3814 and a non-volatile memory 3816 via a bus 3818. The volatile memory 3814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3816 may be implemented by flash memory and/or any other desired type of memory device. Access to the main memory 3814, 3816 is controlled by a memory controller.

The processor platform 3800 of the illustrated example also includes an interface circuit 3820. The interface circuit 3820 may be implemented by any type of interface standard, such as an Ethernet interface, a universal serial bus (USB), and/or a PCI express interface.

In the illustrated example, one or more input devices 3822 are connected to the interface circuit 3820. The input device(s) 3822 permit a user to enter data and commands into the processor 3812. One or more output devices 3824 are also connected to the interface circuit 3820 of the illustrated example. The interface circuit 3820 of the illustrated example, thus, typically includes a graphics driver card.

The interface circuit 3820 of the illustrated example also includes a communication device such as a transmitter, a receiver, a transceiver, a modem and/or network interface card to facilitate exchange of data with external machines (e.g., computing devices of any kind) via a network 3826 (e.g., an Ethernet connection, a digital subscriber line (DSL), a telephone line, coaxial cable, a cellular telephone system, etc.).

The processor platform 3800 of the illustrated example also includes one or more mass storage devices 3828 for storing software and/or data. Examples of such mass storage devices 3828 include floppy disk drives, hard drive disks, compact disk drives, Blu-ray disk drives, RAID systems, and digital versatile disk (DVD) drives.

The coded instructions 3832 of FIGS. 23, 36 may be stored in the mass storage device 3828, in the volatile memory 3814, in the non-volatile memory 3816, and/or on a removable tangible computer readable storage medium such as a CD or DVD.

From the foregoing, it will appreciated that the above disclosed methods, apparatus and articles of manufacture relate to forms and/or forms produced in an in-line process. In some examples, the example forms are produced using a roll of paper that is folded and/or glued one or more times. In other examples, the example forms are produced using a roll of plastic (e.g., PET, plastic film) that is folded and/or fused one or more time times. In example in which the forms are produced using plastic, an inlay and/or tag (e.g., and RFID inlay, an NFC inlay) may be internally positioned within the card produced and/or positioned on and/or carried by the plastic web. Making intelligent cards (e.g., cards including RFID and/or NFC inlays) using an in-line process may significantly reduce the cost of producing such cards.

In examples in which the example plastic cards are produced without an embedded tag, the example cards may be produced by using a roll of film material that is folded and/or fused. In some such examples, the film is a white material and/or imaged with digital, flexographic, offset and/or other static and/or variable printing technologies. In some examples, an exterior layer of film (e.g., poly film) may be coupled and/or fused to the folded PET layers to substantially protect the imaged data, for example.

In examples in which the plastic cards are produced with an embedded tag and/or intelligent functionality (e.g., RFID tag, NFC tag and/or another functional component(s)), the example cards are produced with a roll of film having inlays and/or tags positioned thereon where the film is folded and/or fused. In some examples, the inlays and/or tags are positioned on the PET film by printing and/or imaging an antenna on the film and then positioning a chip adjacent the antenna. In some examples, to substantially prevent deformation and/or damage of the card including the intelligent functionality (e.g., RFID tag, NFC tag), the PET film may be die cut to form an aperture into the chip of the tag is received after the PET film is folded.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
moving a first substrate in a direction, the first substrate comprising a first side opposite a second side, the first side having a first portion and a second portion, the second portion having a first sub-portion and a second sub-portion, the second side having a third portion and a fourth portion;
applying adhesive to the first portion of the first side;
mating a second substrate with the first portion of the first side;
applying adhesive to the third portion of the second side;
folding the first substrate about a first fold line to couple the third portion to the fourth portion;
applying adhesive to the first sub-portion of the second portion; and
folding the first substrate and the second substrate about a second fold line to couple a face of the first sub-portion and a face of the second sub-portion and to position the first substrate between the second substrate.

2. The method of claim 1, further comprising, prior to applying adhesive to the first portion, imaging the first portion.

3. The method of claim 1, further comprising, prior to folding the first substrate about the first fold line, embossing the first substrate and the second substrate to enable the first substrate and the second substrate to include indicia.

4. The method of claim 3, wherein the second substrate comprises a fifth portion and a sixth portion, the first substrate being positioned between the fifth portion and the sixth portion, the fifth portion comprising the embossing and the sixth portion being non-embossed.

5. The method of claim 3, further comprising ink tipping the embossing.

6. The method of claim 1, wherein the folding the first substrate and the second substrate about the second fold line is to produce a multi-layer form.

7. The method of claim 6, wherein the multi-layer form comprises at least one of a card, a tag, an ornament, or a card and key tag.

8. The method of claim 6, further comprising mating the multi-layer form with a third substrate, prior to folding the first substrate about the first fold line, the multi-layer form not being mated to the third substrate.

9. The method of claim 8, wherein the third substrate comprises a carrier web.

10. The method of claim 6, further comprising forming one or more lines of weakness in the multi-layer form.

11. The method of claim 10, wherein the one or more lines of weakness define a removable portion.

12. The method of claim 6, further comprising die-cutting the first and second substrates to separate the multi-layer form from a surrounding waste matrix, after the multi-layer form is separated from the surrounding waste matrix, a perimeter of the multi-layer form is free of any fold lines.

13. The method of claim 1, wherein the first substrate comprises paper and the second substrate comprises polystyrene.

14. The method of claim 1, wherein the method comprises an in-line process.

15. The method of claim 1, further comprising forming a line of weakness through the first and second substrates to define a card surrounded by a waste matrix.

16. The method of claim 1, wherein the first substrate comprises plastic.

17. The method of claim 1, further comprising inlaying the first substrate.

* * * * *